(12) United States Patent
Lyrstrand et al.

(10) Patent No.: US 6,709,208 B1
(45) Date of Patent: Mar. 23, 2004

(54) DEVICE AT A SYSTEM FOR HANDLING CARGO

(75) Inventors: Michel Lyrstrand, Mölndal (SE); Göran Johansson, Göteborg (SE); Bengt Ramne, Malvern, PA (US); Per Fagerlund, Torslanda (SE)

(73) Assignee: TTS Ships Equipment AB (SE)

( * ) Notice: Subject to any disclaimer, the term of this patent is extended or adjusted under 35 U.S.C. 154(b) by 0 days.

(21) Appl. No.: 09/979,947

(22) PCT Filed: May 3, 2000

(86) PCT No.: PCT/SE00/00855

§ 371 (c)(1),
(2), (4) Date: Nov. 5, 2001

(87) PCT Pub. No.: WO00/66420

PCT Pub. Date: Nov. 9, 2000

(30) Foreign Application Priority Data

May 3, 1999 (SE) ................................................ 9901586

(51) Int. Cl.⁷ ................................................ B60P 7/08
(52) U.S. Cl. ............................ 410/115; 410/46; 410/65; 410/67; 410/8; 410/9; 410/12; 410/103; 410/23; 410/106; 410/30
(58) Field of Search ............................ 410/46, 66, 67, 410/65, 56, 8–12, 23, 100, 35, 103, 106, 30, 115; 248/499; 114/218

(56) References Cited

U.S. PATENT DOCUMENTS 2,001,935 A * 5/1935 Otis
2,023,972 A * 12/1935 Otis
3,140,850 A * 7/1964 Packard
3,187,686 A * 6/1965 Podesta
3,377,044 A   4/1968 Jackson et al.
4,307,985 A * 12/1981 Desprez et al. ............... 410/46
4,993,898 A * 2/1991 Klahold ....................... 410/12
5,908,274 A   6/1999 Silberman .................... 410/10
6,210,088 B1 * 4/2001 Crosby ........................ 410/35
6,422,795 B2 * 7/2002 Holt et al. ................... 410/115
6,439,594 B1 * 8/2002 Johansson

FOREIGN PATENT DOCUMENTS

EP          0366571        10/1989
JP          6016378         8/1985
SE          9600632-5    *  9/1997
WO          WO/97/30890  *  8/1997

* cited by examiner

Primary Examiner—Stephen T. Gordon
(74) Attorney, Agent, or Firm—Orum & Roth

(57) ABSTRACT

The invention relates to an arrangement for a cargo handling system which is arranged for use on board a ship. Long lane dividers, which are in the form of profiles, are so arranged as to be laid out on the deck of a ship along the longitudinal extent of the intended desired cargo lane. Attachment devices matching existing standard openings in the deck and capable of being introduced vertically into these attach the lane dividers to the deck. At least a number of the aforementioned lane dividers exhibit recesses to accommodate locking devices for the purpose of locking a cargo securely to them.

21 Claims, 26 Drawing Sheets

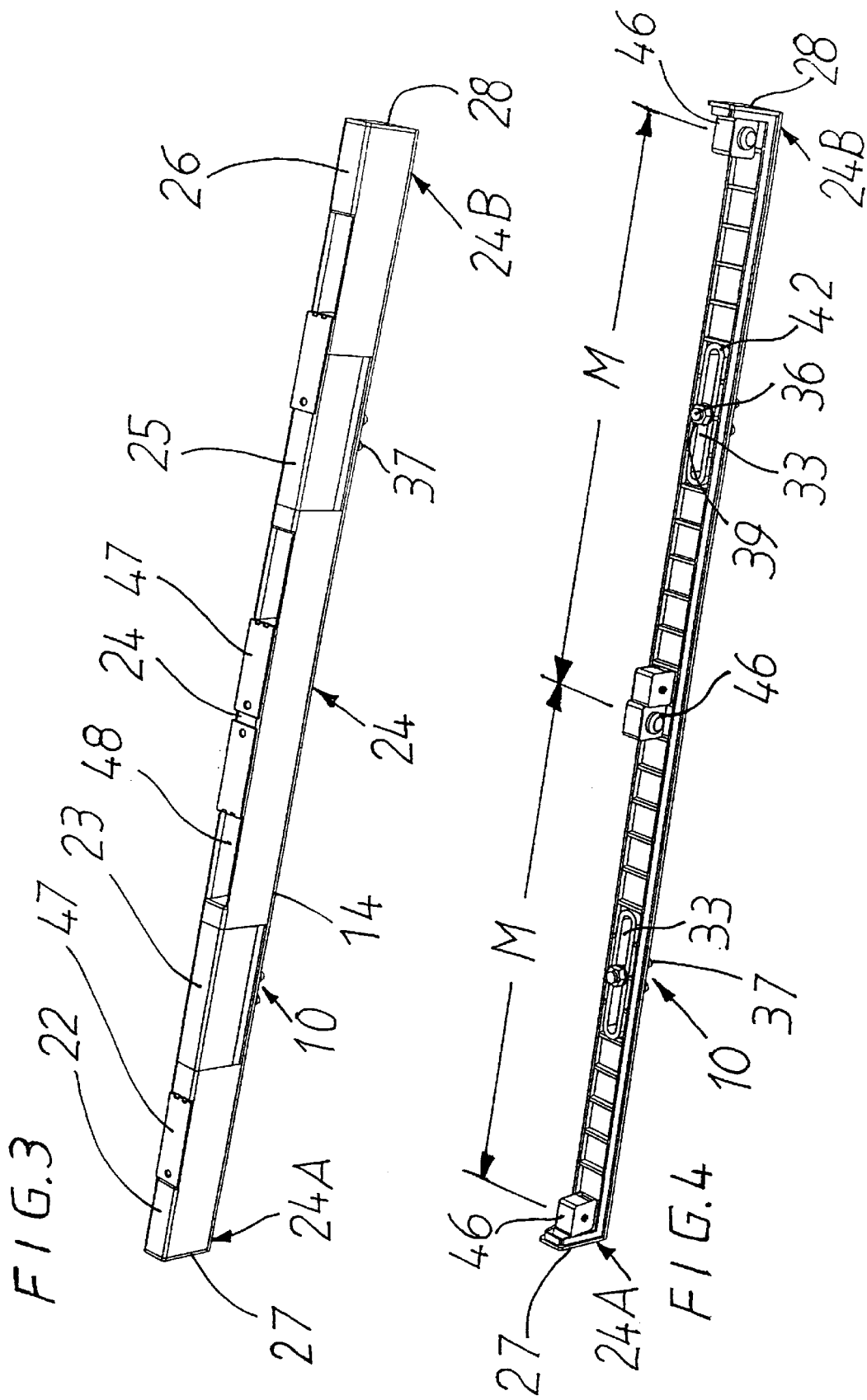

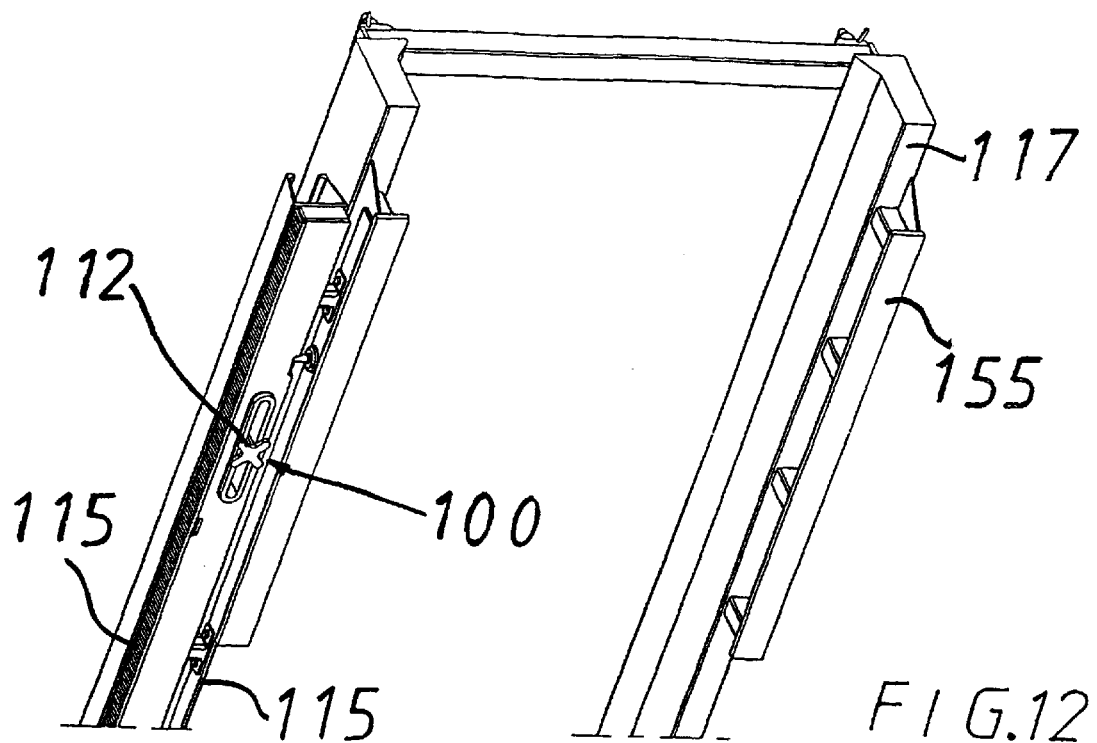
FIG.12
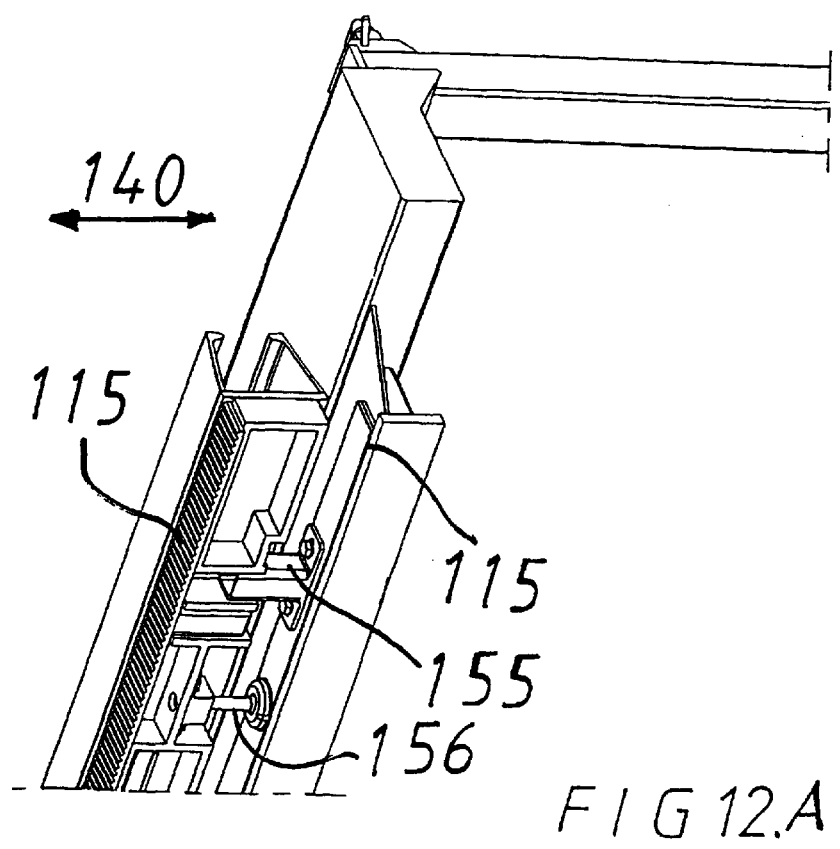
FIG 12.A

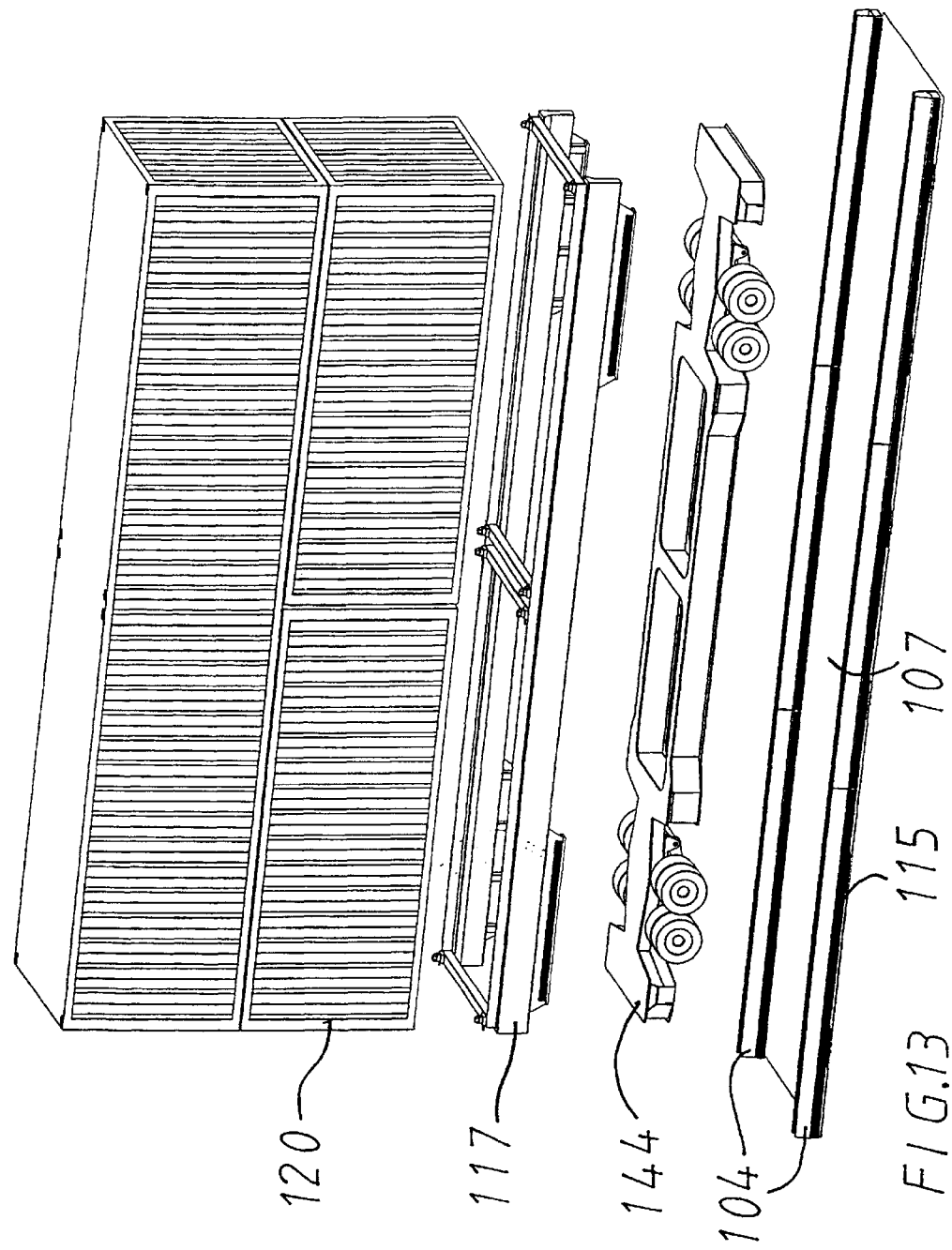

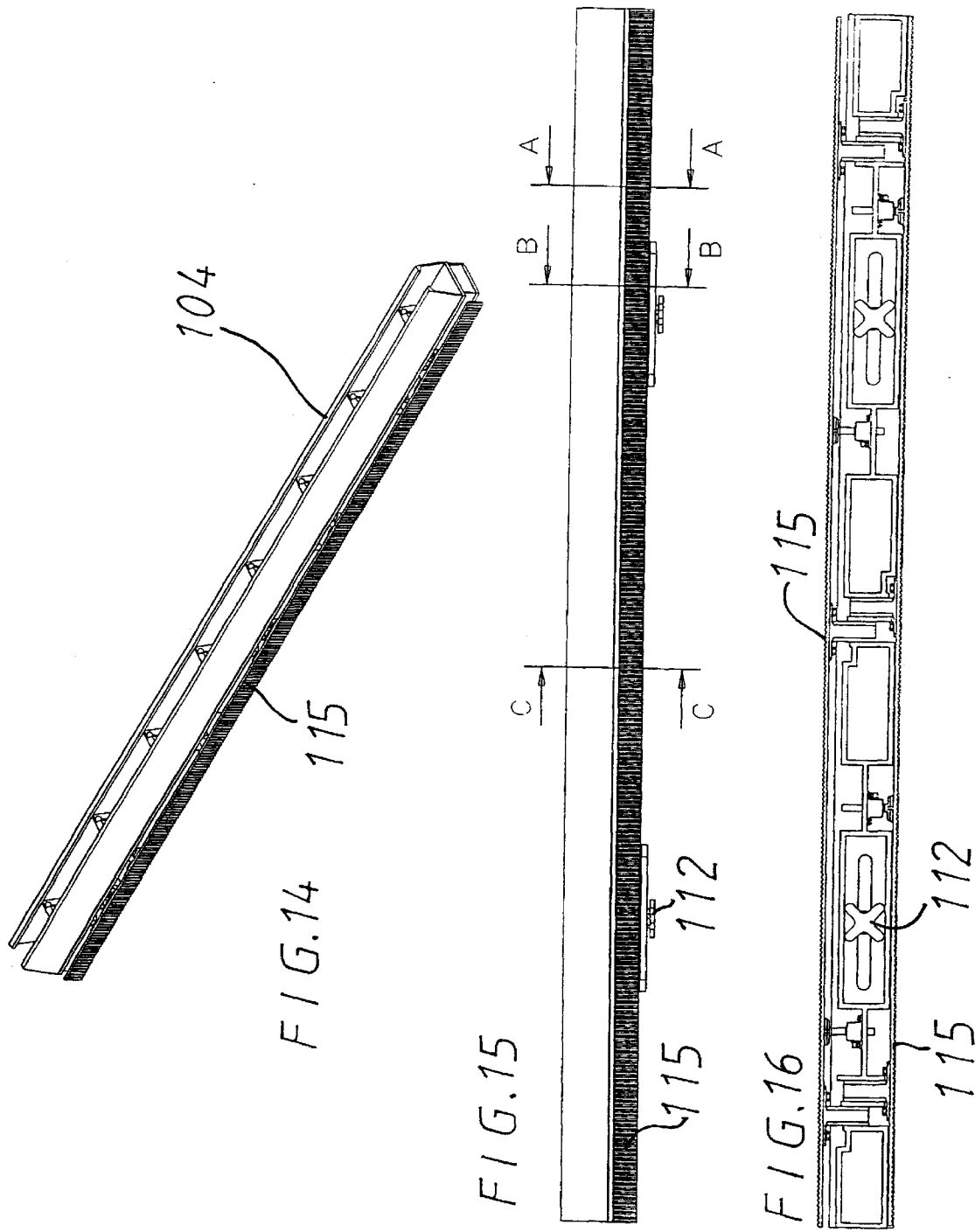

SECTION A-A

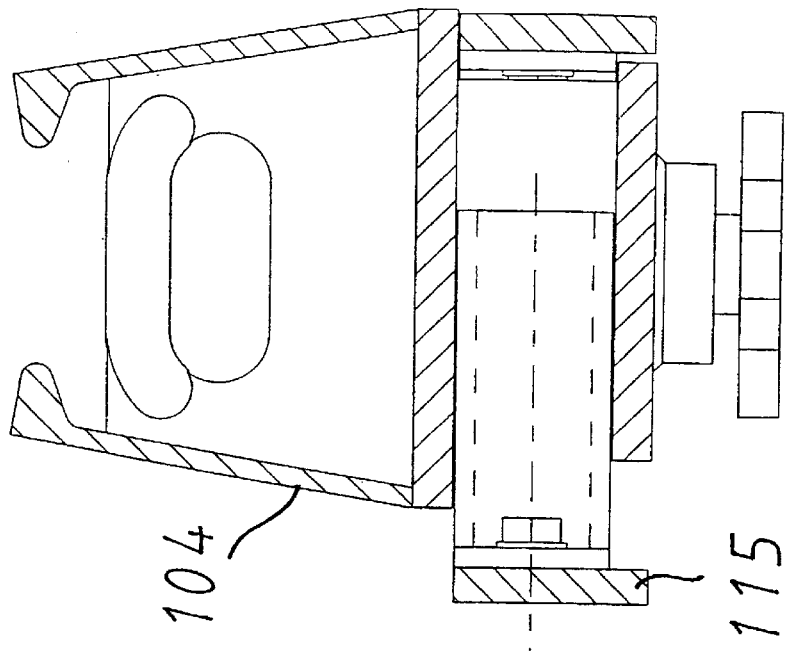
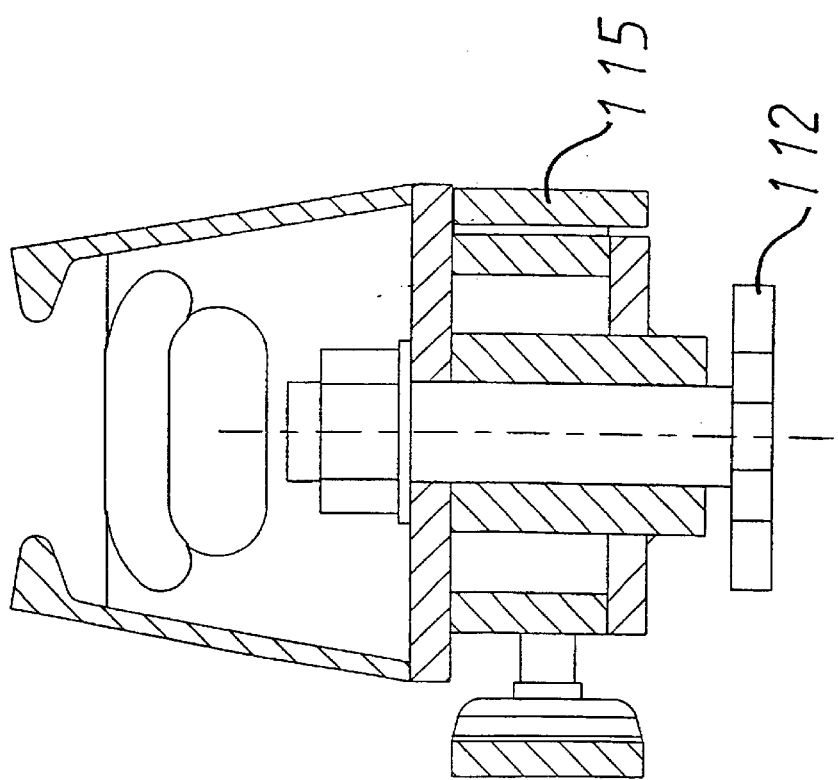
SECTION B-B
FIG. 19
SECTION C-C
FIG. 20

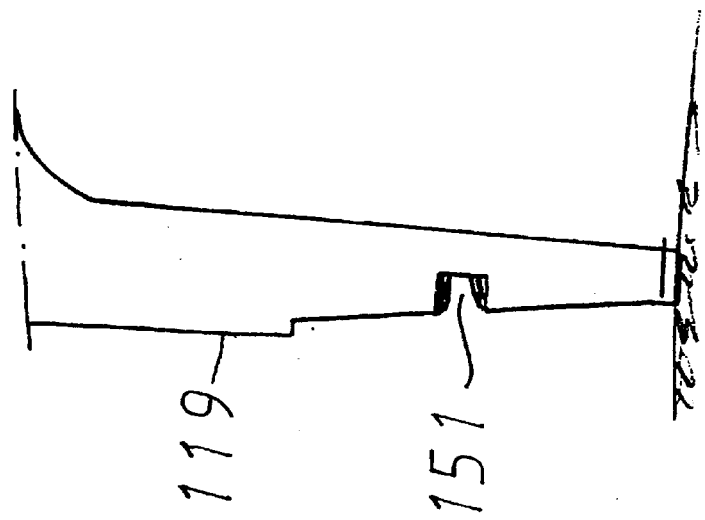
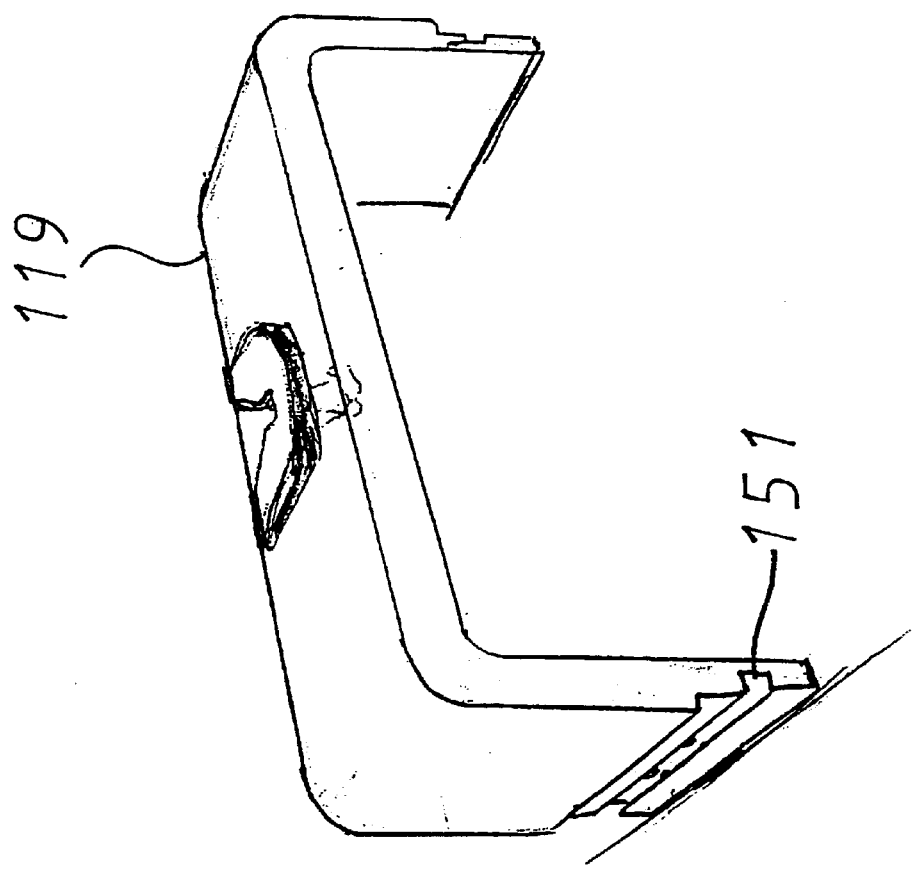

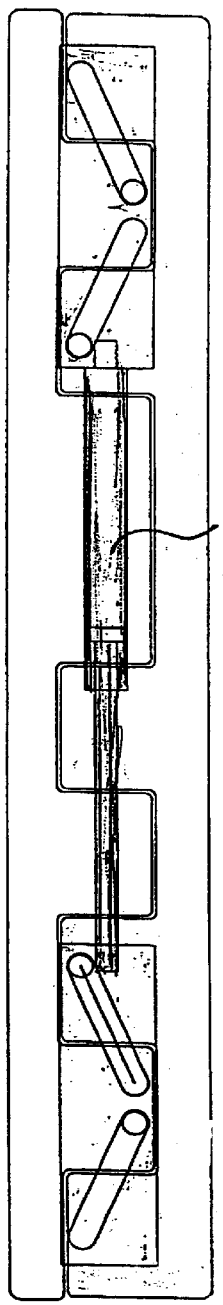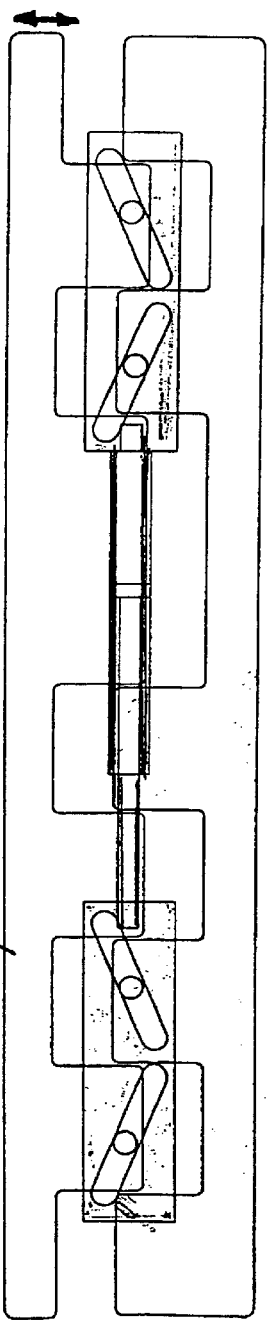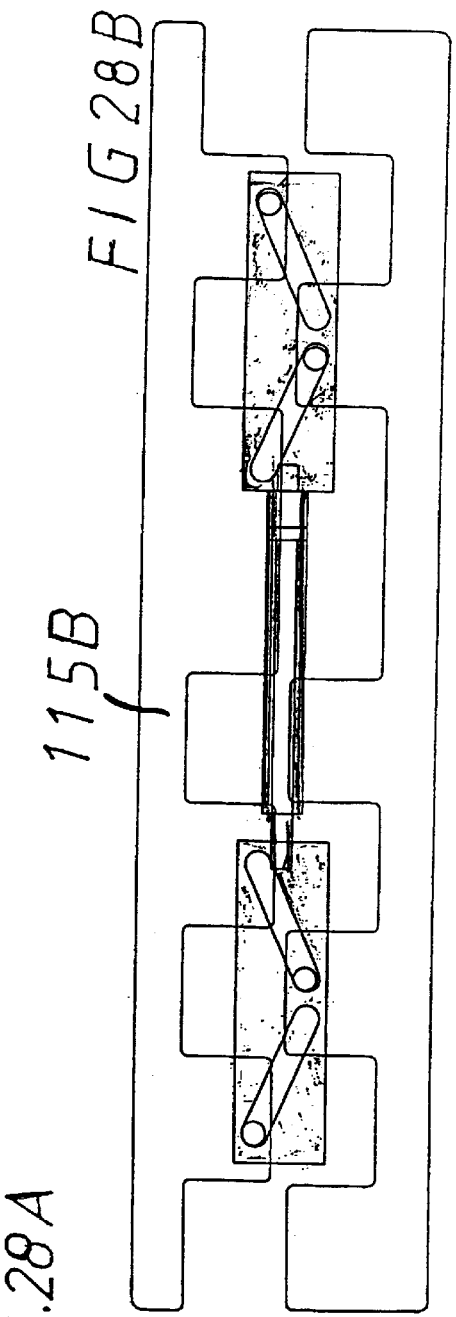

DEVICE AT A SYSTEM FOR HANDLING CARGO

The present invention relates to an arrangement for a cargo handling system which is arranged for use on board a ship.

The principle of dividing up various cargo decks into different lanes by marking the lanes with paint on the deck is previously known on board ships. Also previously disclosed is the principle of setting out loose lateral dividers in the form of beams on the ship's deck in some cases. Also previously disclosed through Swedish Patent Application SE 9600632-5 is the principle of causing trailers to be secured to ships by the use of trailer supports to lock them by means of locking devices to existing slots recessed into the deck.

When a cargo carried by a cargo carrier which is being transported between the land and a ship by means of a so-called AGV (automated guided vehicle), i.e. a cargo exchanger which is a self-propelled, self-navigating vehicle so arranged, on the one hand, as to be driven entirely individually, and so arranged, on the other hand, that a number of cargo exchangers can be connected together to form a train to provide increased capacity, such as when the freight placed on standardized cassettes has arrived at a terminal next to the ship, the aforementioned cargo exchangers, which exhibit hoisting devices for the purpose of raising and lowering their height, can then drive in under the cassette concerned and lift it and drive on board the ship. This presents problems in conjunction with the ability to stow the items closely and securely, and also with the ability to secure cassettes and trailers safely to the ship without unnecessary waste of space in the longitudinal sense.

The principal object of the present invention is thus, in the first instance, to attempt to solve the aforementioned problems and to be able to increase speed and safety in conjunction with transport on the ship in question along the intended lanes without the need to modify the ships.

The aforementioned object is achieved by means of an arrangement in accordance with the present invention, which is characterized essentially in that long lane dividers, which are in the form of profiles and are so arranged as to be laid out on the deck of a ship along the longitudinal extent of the intended desired loading lane at a lateral distance from one another, exhibit means for the attachment of the lane dividers to the deck, in that the aforementioned means of attachment are formed by attachment devices matching existing standard openings in the deck and capable of being introduced vertically into these, so that a suitable cargo, for example a cargo trailer or cargo cassettes, can be driven in and accommodated between these, and in that at least a number of the aforementioned lane dividers exhibit recesses to accommodate locking devices for the purpose of locking a cargo securely to them and/or in that a number of the aforementioned lane dividers exhibit laterally mobile locking devices for the purpose of locking the aforementioned cargo securely in place.

The invention is described below as a number of preferred illustrative embodiments, in conjunction with which reference is made to the accompanying drawings, initially FIGS. 1–8, and subsequently to FIGS. 9–28B, in which:

FIG. 3 shows a perspective view of a lane divider profile viewed at an angle from above;

FIG. 4 shows the bottom of a profile illustrated in FIG. 3 viewed at an angle from above;

FIGS. 9–28B show different variants of the arrangement with locking devices arranged supported by lane dividers, where:

FIGS. 9–20 show lock arrangements for cargo cassettes; and

FIGS. 21–28B show different variants of arrangements with locking devices for trailer supports.

Figure 1:
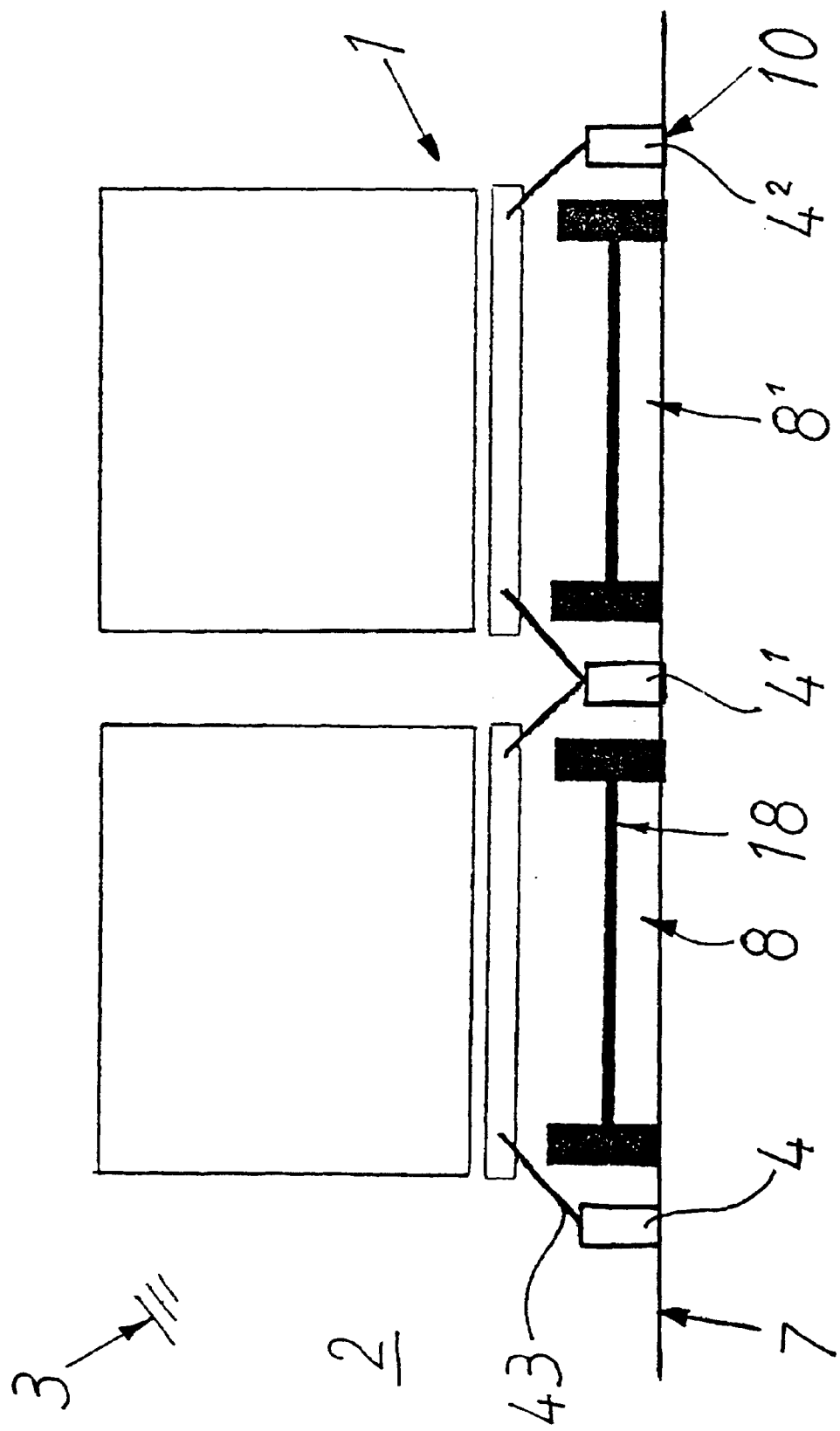
FIG. 1 shows the invention diagrammatically in a vertical cargo position viewed in a direction along its longitudinal extent.
Figure 2:
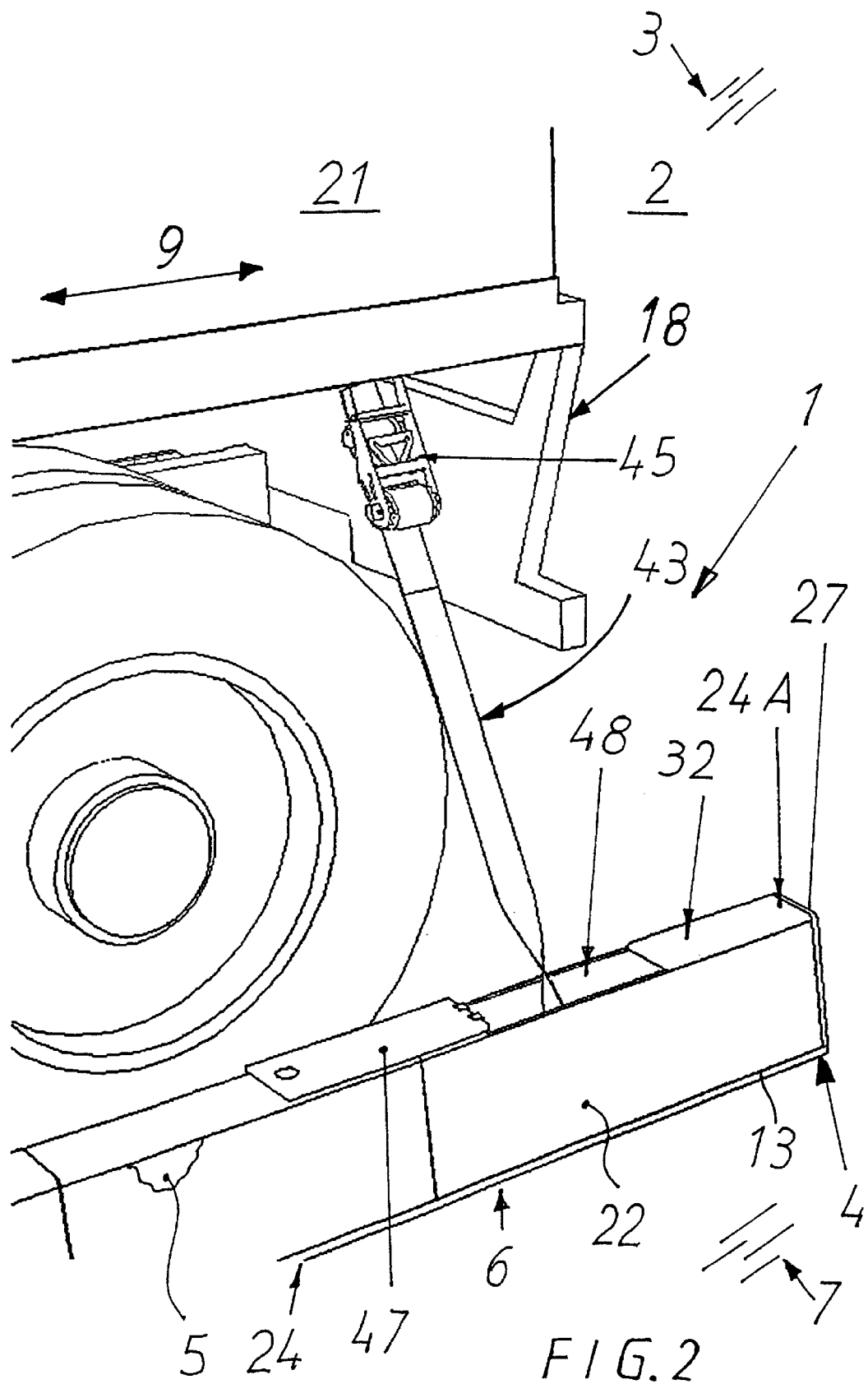
FIG. 2 shows the securing of the rear end of a trailer to the deck by means of the invention.
Figure 5:
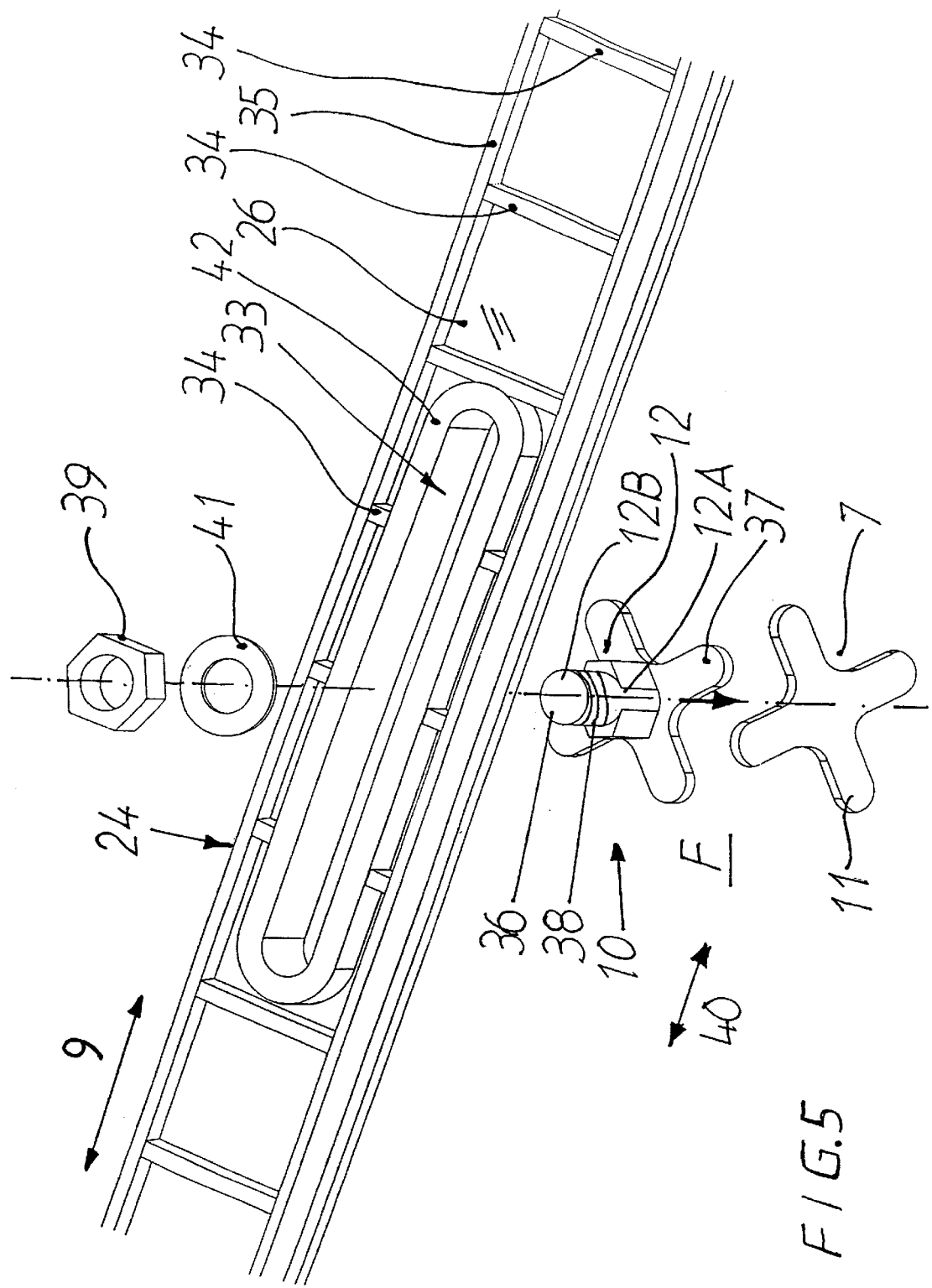
FIG. 5 shows a detailed view of the constituent means of attachment for attaching the profile to he deck.
Figure 6:
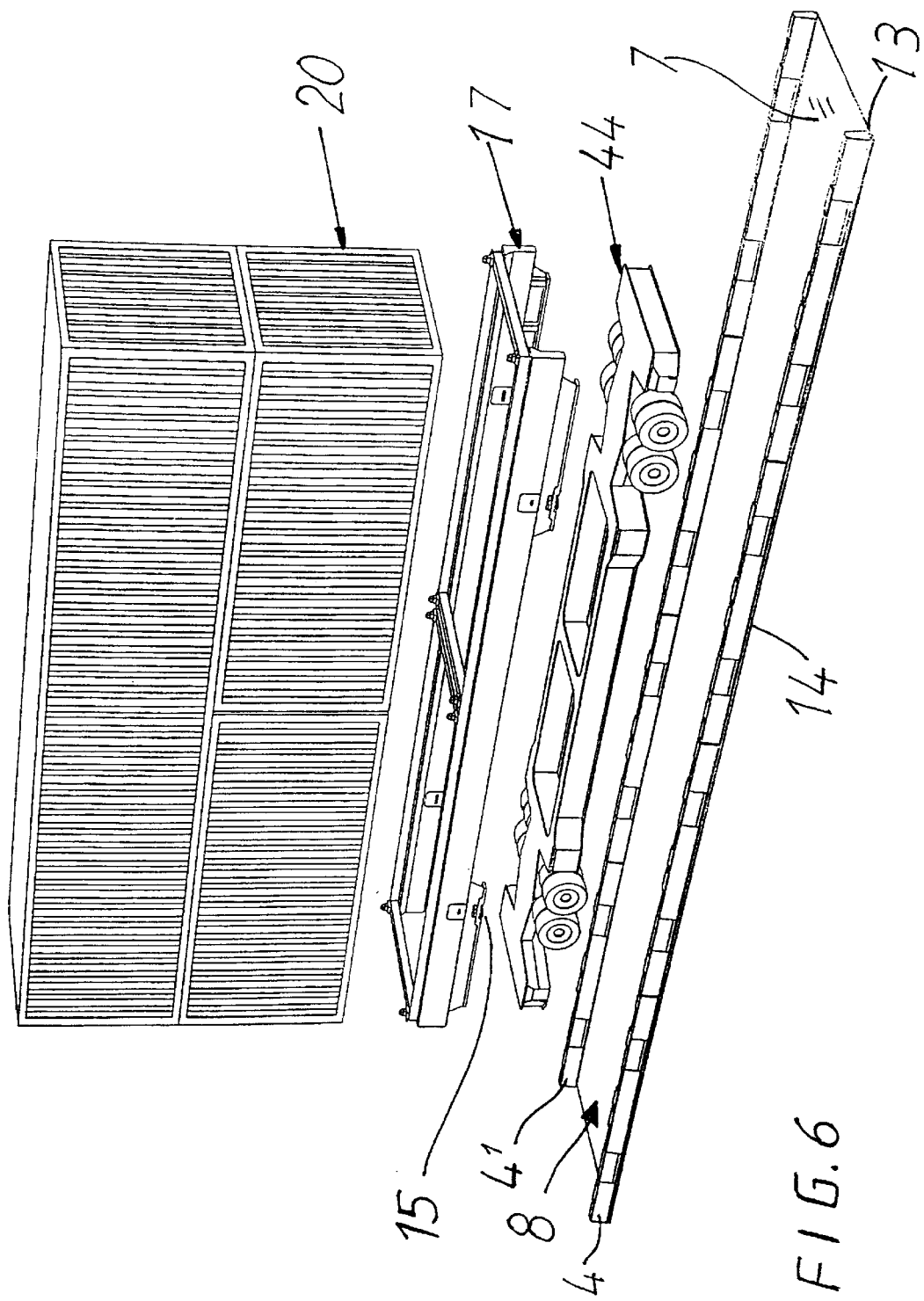
FIG. 6 shows an exploded view of the invention applied to a cargo cassette and a cargo tensioner intended for the purpose.

An arrangement 1 for a cargo handling system, which is arranged for use on board 2 ships 3, comprises a number of long lane dividers 4, $4^1$, $4^2$, which are in the form of, for example, hollow 5 profiles 6. The aforementioned profile lane dividers 4, $4^1$, $4^2$ may be 5 m in length and are thus capable of being handled easily by, for example, a loading truck in conjunction with their positioning in the ship and their removal from the ship in question. Their weight is thus not too great, and they are easy to handle, enabling them to be laid out simply on the deck 7 of the ship in question along the entire longitudinal extent 9 of the intended desired loading lane 8, $8^1$. The aforementioned lane dividers 4, $4^1$, $4^2$ exhibit means 10 for their secure attachment to the deck 7. The aforementioned means of attachment are formed by attachment devices 12 matching existing standard openings 11 in the deck 7 and capable of being introduced vertically into these. At least a number of the aforementioned lane dividers 4, $4^1$, $4^2$ exhibit recesses 13, 14 which are so arranged as to accommodate locking devices 15, 16 in so-called cargo carriers, so-called cargo cassettes 17 and trailer/trailer supports 18, 19, for locking them and the cargo 20, 21 in question securely to the lane dividers.

The aforementioned lock recesses are in the form of long, channel-like sections 13, 14, which are situated at the bottom 23 of the lane dividers on their underside 22, and a standing part 25 to either side A, C of the lane dividers 4, $4^1$, $4^2$.

The lane dividers 4, $4^1$, $4^2$ are appropriately in the form of a separate bottom frame 24 and a number of profile sleeves 49, 50, 51, 52, 53 capable of attachment to the frame 24, which sleeves, for example, can be securely bolted to the frame 24 and its two end walls 27, 28 situated at the long ends 24A, 24B. In order to ensure that the lane dividers are connected together in a straight manner in the longitudinal sense, it is possible for means to be provided at the long ends of the separate profiles 6 which solve this problem, for example male-female connecting devices may be provided, which are connected together in pairs, although the nature of these must be such that it makes no difference which ends of the profiles face towards one another in order to engage closely with one another.

The aforementioned lane dividing profiles 4, $4^1$, $4^2$ are preferably made of a metal material, such as steel, and exhibit slightly converging side walls 29, 30 facing in a direction upwards 31 from their base 23 and a flat or curved upper part 32.

The bottom 23 of the lane dividers 4, 4¹, 4² exhibits channel-like recesses 33, which extend in a direction 9 along the longitudinal extent of the aforementioned lane dividing profiles and can have the form of a flush border which is accommodated between transverse and longitudinal reinforcing struts 34, 35 and the bottom plate 26. The attachment devices 12 can be so arranged as to extend through the aforementioned recesses 33 with a shaft part 36. The aforementioned attachment devices 12 appropriately comprise a long rotating bolt, which, at its lower end 12A, supports a laterally 40 extending attachment part 37. Present at the upper end 12B of the attachment device are threads 38 which match a rotating nut 39 or some other clamping means. The extending attachment part 37 of the attachment device 12 is clamped securely to the deck 7 by means of the nut 39.

The aforementioned attachment part 37 is connected in a non-rotating fashion to the rotating bolt 36 and exhibits a peripheral form such that, in the released position F, it can be introduced through the aforementioned openings 11 in the deck 7, whereas, when rotated into a position L intended for securing, it is clamped securely to the underside 7A of the deck and is prevented from being withdrawn through the aforementioned appropriately congruent openings 11, which are nevertheless executed with a slightly larger width. The nut 39 with a subjacent washer 41 is clamped securely to the upper side 42 of the slot-shaped recess 33 in the bottom frame 24.

Accommodated internally in the aforementioned lane divider 4, 4¹, 4² is a number of securing tensioning devices 43, which are appropriately in the form of straps with strap tensioners 45. The straps 43 can be withdrawn and gathered together in the form of rolls 46 at a mutual distance M from one another in the respective lane dividers 4, 4¹, 4² in spaces 48 capable of being closed with covers 47.

The function of the invention with its associated lashings in conjunction with trailer trestle stands 19 is as follows:

Trailer lashing at the rear end:

Lashings straps 43 are used to lash the trailer 18 at the rear end. These lashing straps 43 are positioned on rolls 46 in the lane dividers. Each lane divider has a space 48 for 2–4 rolls, which can be positioned anywhere in the fore-and-aft direction.

Hand grip in conjunction with lashing:

1. The lashing strap 43 is pulled out and hooked onto lashing eyes on the trailer 18.
2. The strap 43 is pulled out to its full length.
3. The strap 43 is tightened with a handle 45.

Trailer lashing at the front end; difference with existing systems:

1. The trailer support stand 19 can be locked at any point in the fore-and-aft direction and is not dependent on recesses in the deck 7.
2. The trailer support stand is locked to the lane dividers 4, 4¹, 4² when the terminal tractor sets down the support stand 19 on the deck 7, appropriately by releasing it by mechanical means. No active hydraulics are required.

The function of the invention in conjunction with cargo exchanger vehicles 44, so-called AGVs, is as follows, for example:

An AGV, automated guided vehicle 44, which is to be used for transporting freight at the terminal and on board the ship is, as described above, a self-propelled, self-navigating vehicle which, on the one hand, can be driven entirely individually and, on the other hand, a number of cargo exchangers can be formed into a train to provide increased capacity.

1. The freight 20 is placed on a standardized cassette 17 when it arrives at the terminal.
2. The AGV advances under the cassette, lifts it and drives it on board the ship.
3. The cassette 17 is set down on the ship, and the AGV 44 drives ashore and collects the next freight cassette.

Automated lashing of AGV cassettes:

Mounted in the AGV cassettes 17 are locking devices 15, which are automatically unlocked when the AGV 44 advances under the cassette 17, and are locked once the AGV 44 has set down the cassette 17. the locking devices 15 in the cassette 17 lock in engagement with the longitudinal grooves 13, 14 in the transportable lane dividers 4, 4¹, 4². The advantage of locking with the lane divider 4, 4¹, 4² is that one is not dependent on recesses in the deck, but you can place the cassette in any preferred position in the fore-and-aft direction.

The aforementioned lane dividers 4, 4¹, 4² can exhibit a height H of ca. 0.4 m and a width B of ca. 0.2 m, and they can be positioned at a lateral distance from one another, appropriately a distance of ca. 2.65 m, so that a suitable cargo, for example cargo trailers or cargo cassettes, i.e. AGVs, can be driven in and accommodated between them.

Figure 7:
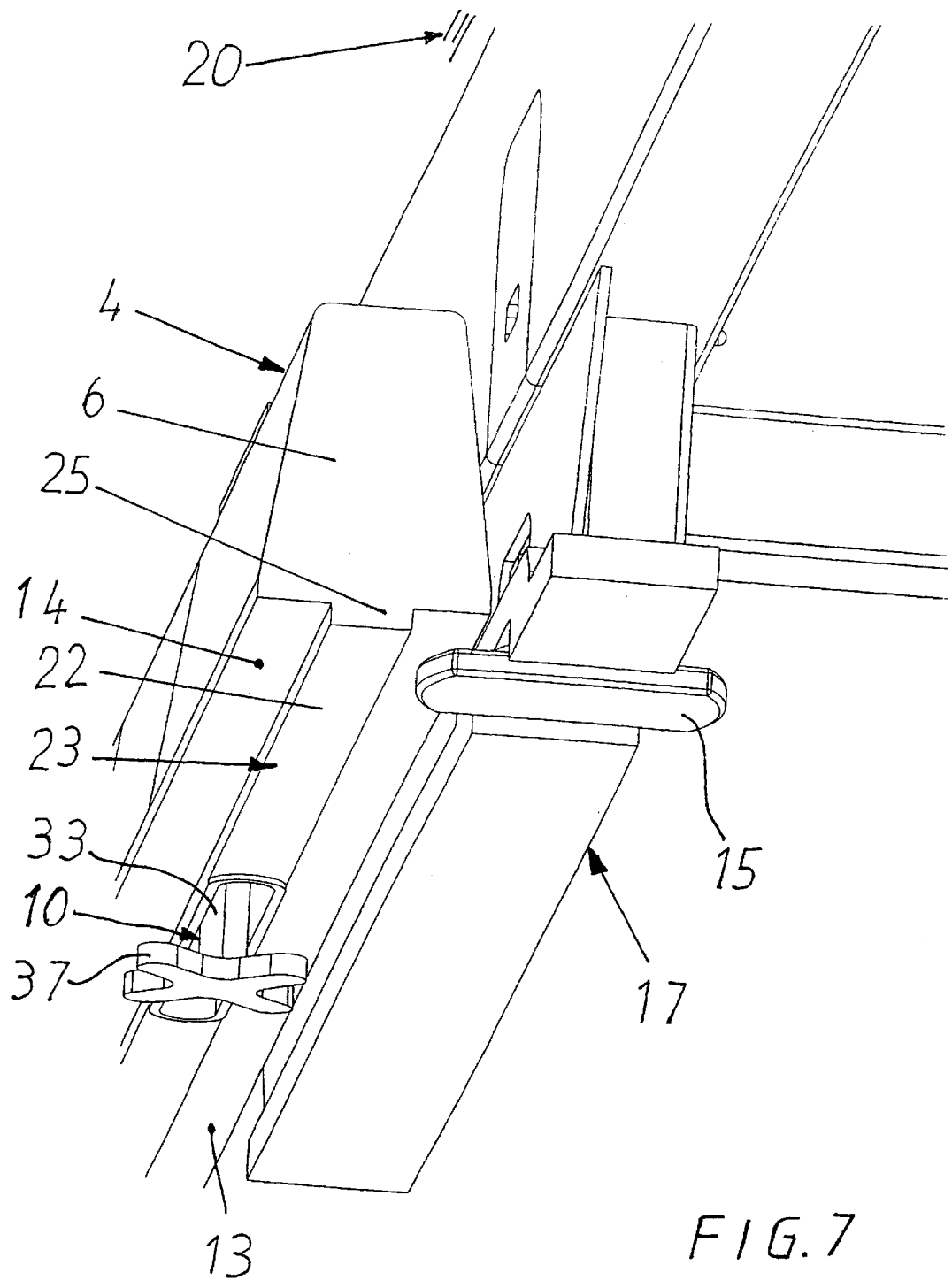
FIG. 7 shows a perspective view of the profile viewed from below in a position in which it is assembled with the cassette.
Figure 7A:
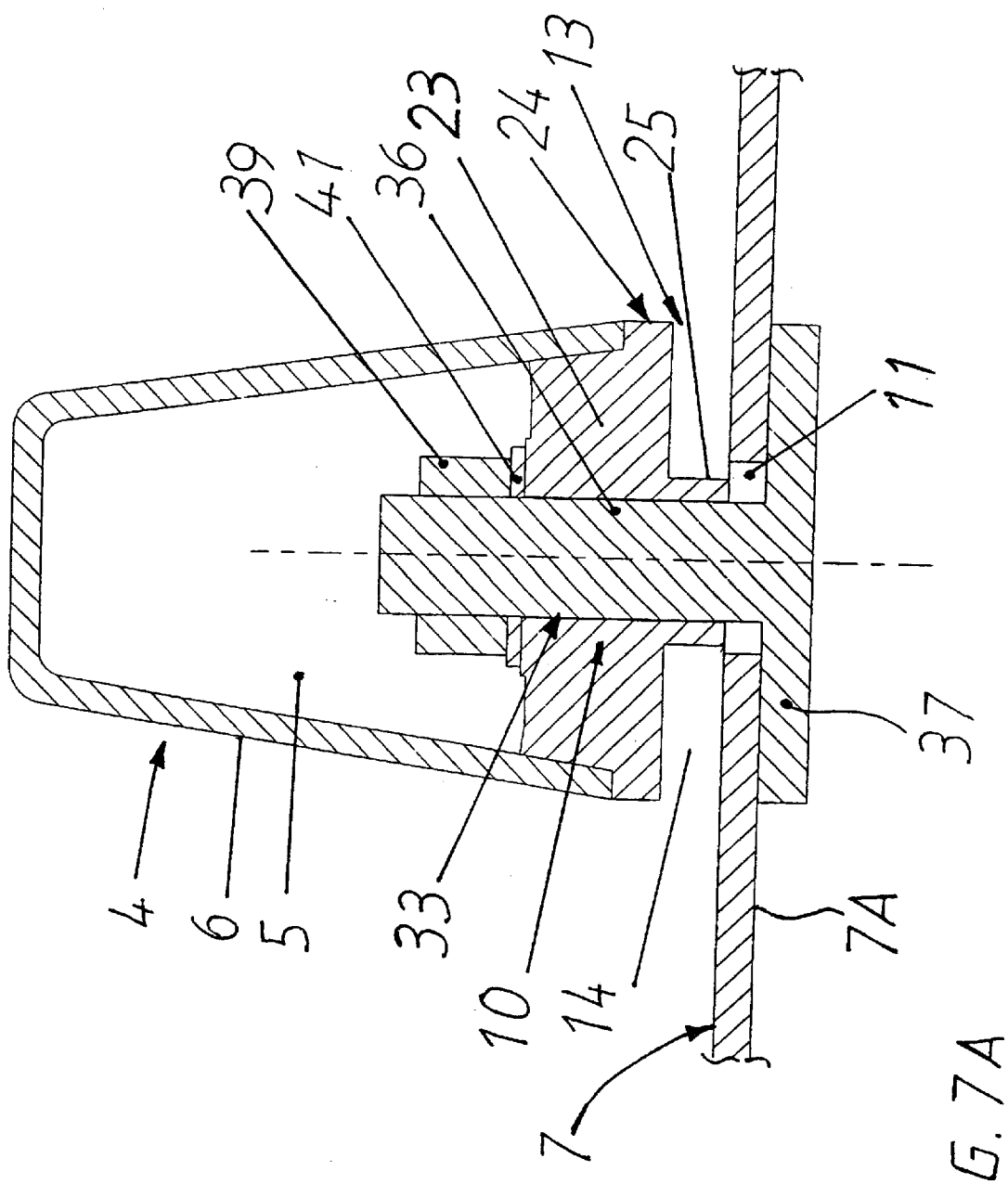
FIG. 7A shows a sectioned view in the area of attachment between the profile and the deck.
Figure 8:
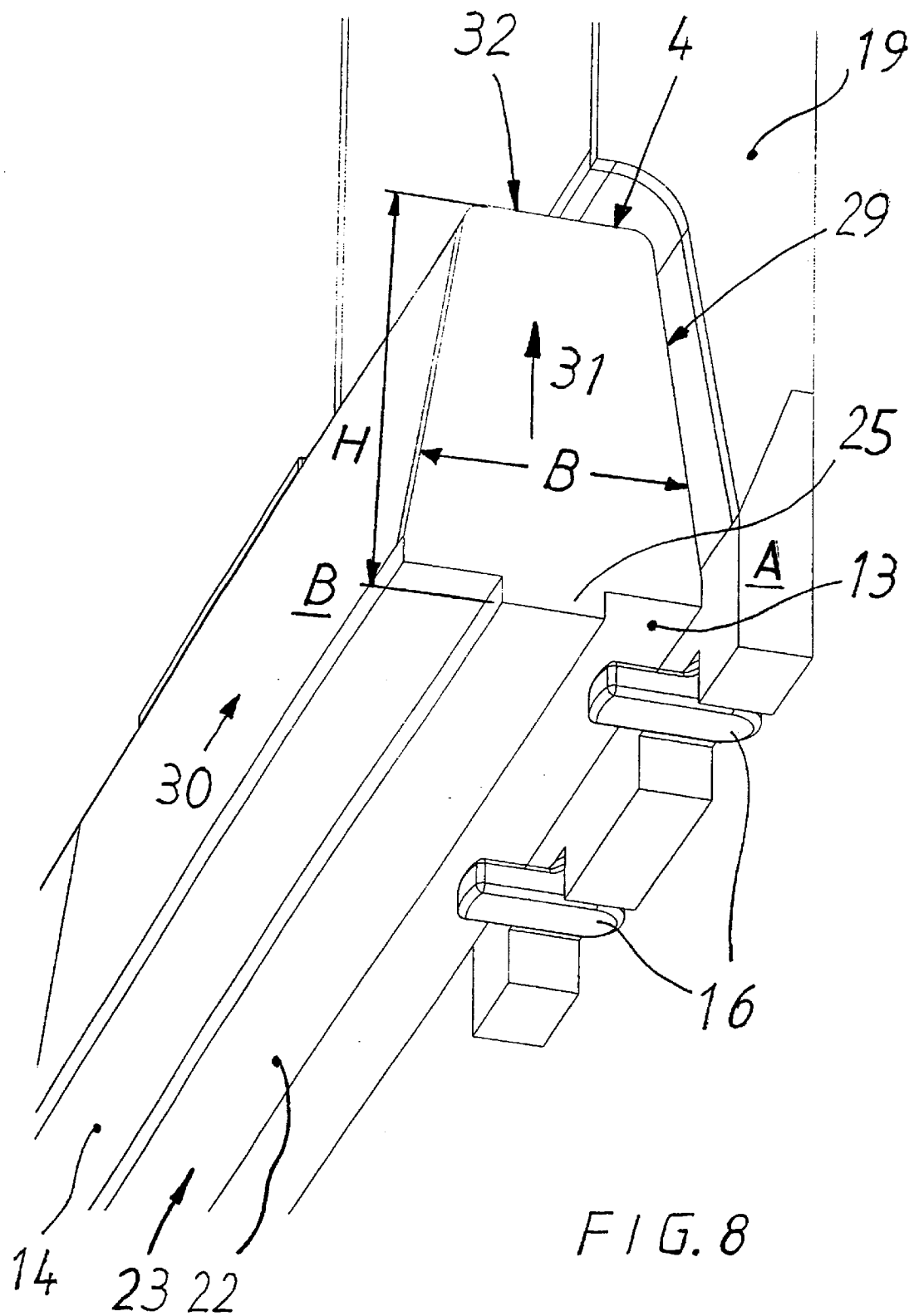
FIG. 8 shows a perspective view of the profile viewed at an angle from below in a position in which it is assembled with a trailer support.
Figure 9:
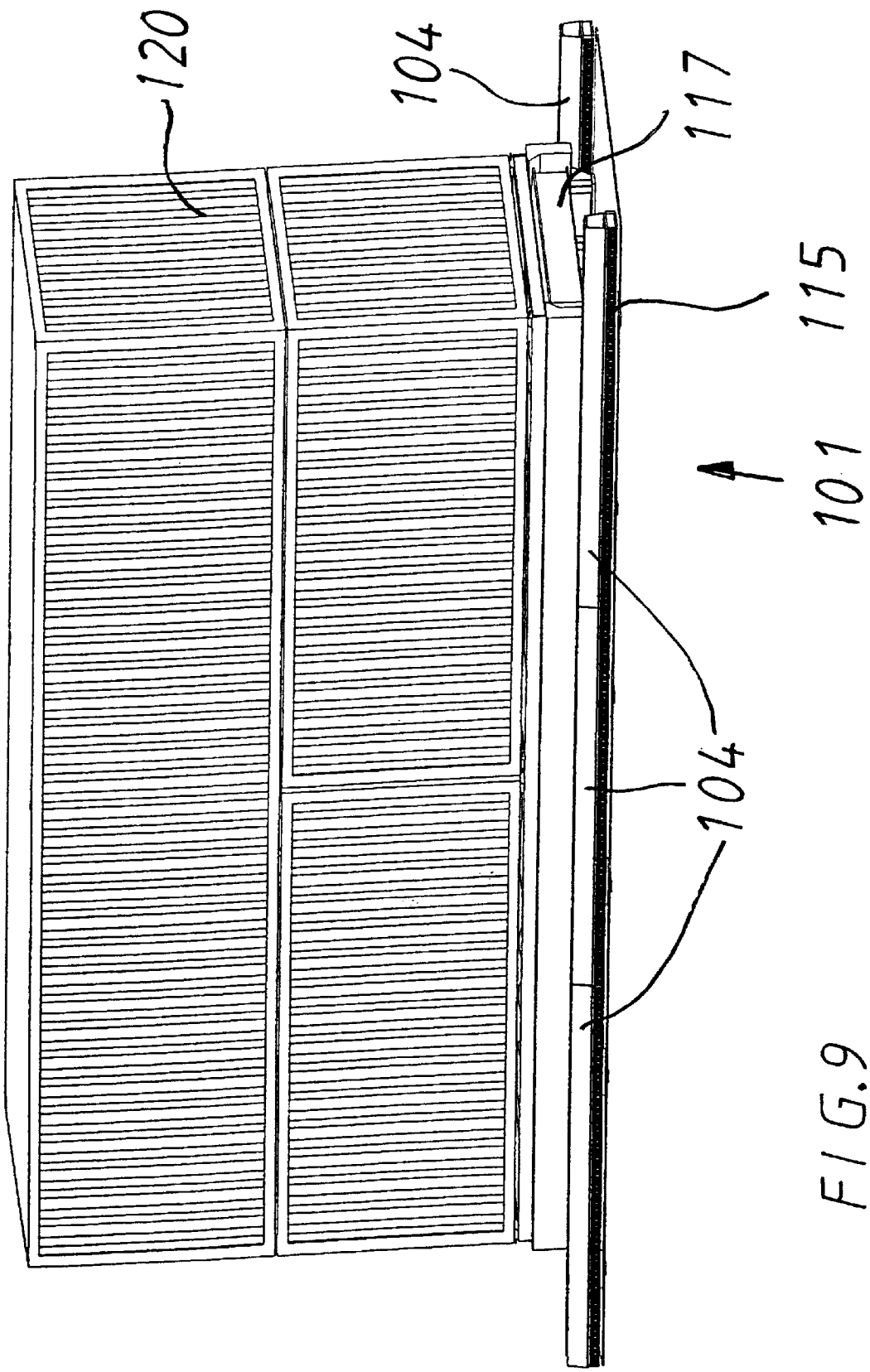

Once the cargo has been driven in between the lane dividers 4, 4¹, 4²and has been stacked close up to the other cargos, it is locked to the deck 7, after having been lowered to the deck 7, by means of the aforementioned pairs of laterally positioned lane dividers 4–4¹, 4¹–4² ... by activating their locking devices 15, 16 so that they are guided in beneath adjacent lane dividers 4–4² ... and into a matching channel-like recess 13, 14, for example as shown in FIGS. 7 and 8.

Lashing straps can also be attached to the higher parts of the cargo.

The variants of the invention which are shown in the other drawings will now be described, in conjunction with which any components that are common with the embodiments described above have been given the same reference designations as in the first illustrative embodiments of the invention.

As can be appreciated from the drawings, these variants of the invention also comprise an arrangement 101 which lends itself to application for a cargo handling system which is so arranged as to be used on board a ship, in conjunction with which long lane dividers 104, which are formed upwardly open or closed profiles 106 and are arranged to be laid out on the deck of a ship along the longitudinal extent of the desired loading lane at a distance K laterally 140 from one another, exhibit means 100 for the attachment of the lane dividers 104 to the deck 107. The aforementioned attachment means 100 are formed by attachment devices 112 matching existing standard openings in the deck 107 and capable of being introduced vertically into these, so that a suitable cargo, for example a cargo trailer or cargo cassettes, can be driven in and accommodated between these.

At least a number of the aforementioned lane dividers 104 exhibit laterally 140 moving locking devices 115, which are arranged for the purpose of locking the aforementioned cargo 117, 118, 119, 120, 121 securely.

The aforementioned locking devices are formed by at least one locking device 115 arranged on the side of the aforementioned lane divider 104, which can be so arranged as to be accommodated by a matching recess 150 situated on the side of the cargo 117, 118, 119, 120, 121. They can be formed appropriately by grooved rails capable of interacting with one another.

The locking device can also be formed by a long locking heel 115A, 115B, which extends along the intended lane divider 104 and is capable of actuation causing it to be displaced laterally across its longitudinal direction, and which is capable of being accommodated in a recess 151 extending into the lane divider.

Driving devices 152, 153 for the aforementioned locking devices 115A, 115B are accommodated internally inside a cavity 154 in the lane divider 104.

The aforementioned recesses 150, 151 in the cargo 117 are appropriately situated at a distance M from the lower part 154 of the cargo on which it is set down.

Figure 10:
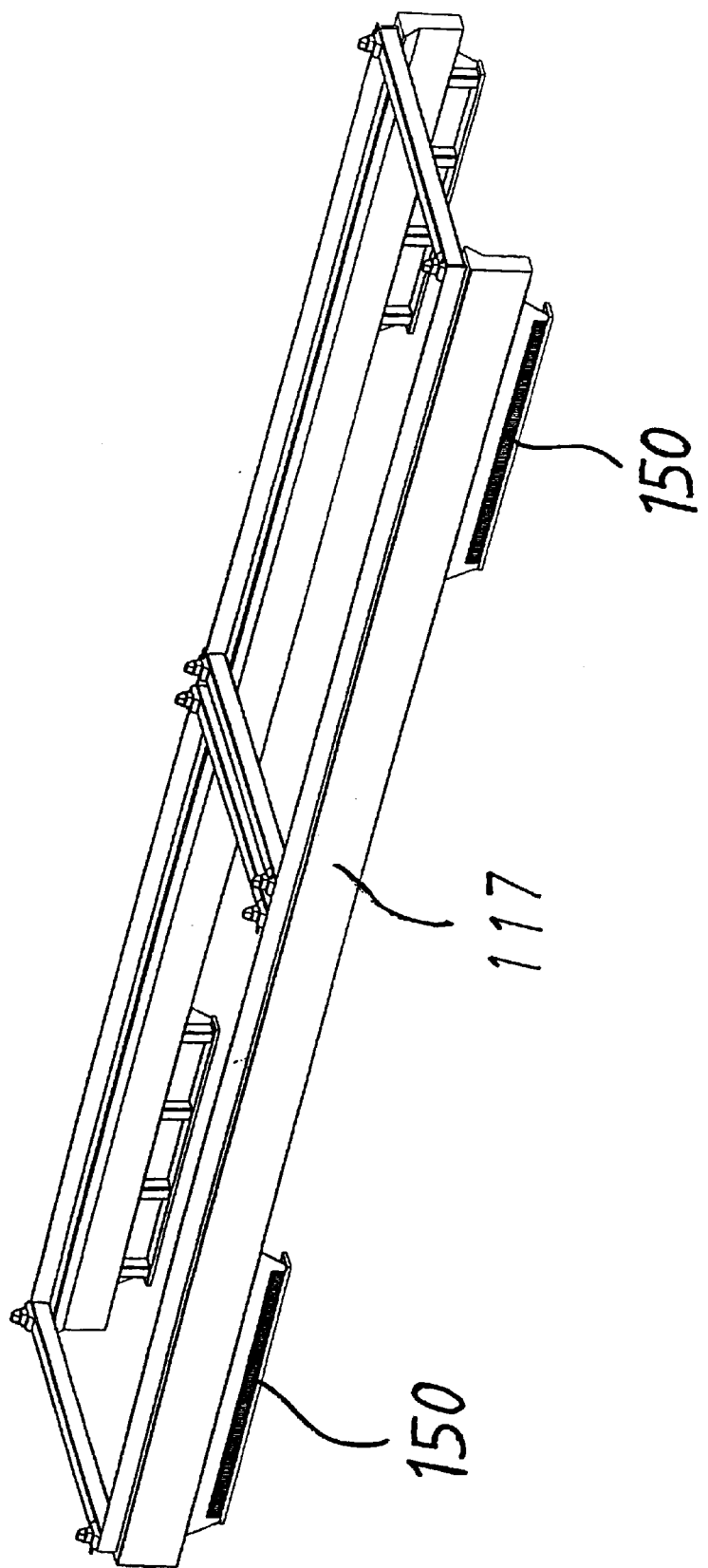
Figure 11:
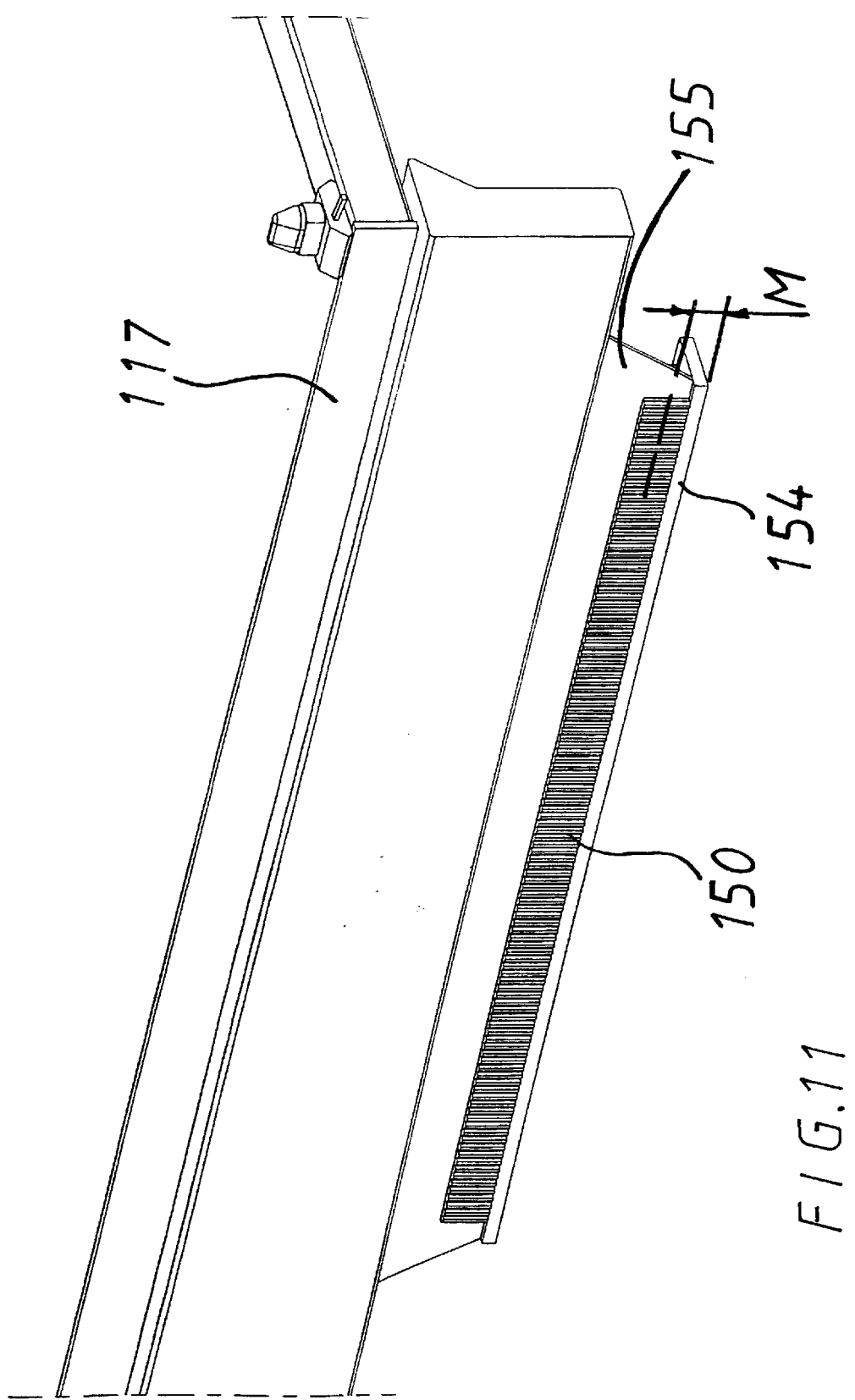
Figure 12B:
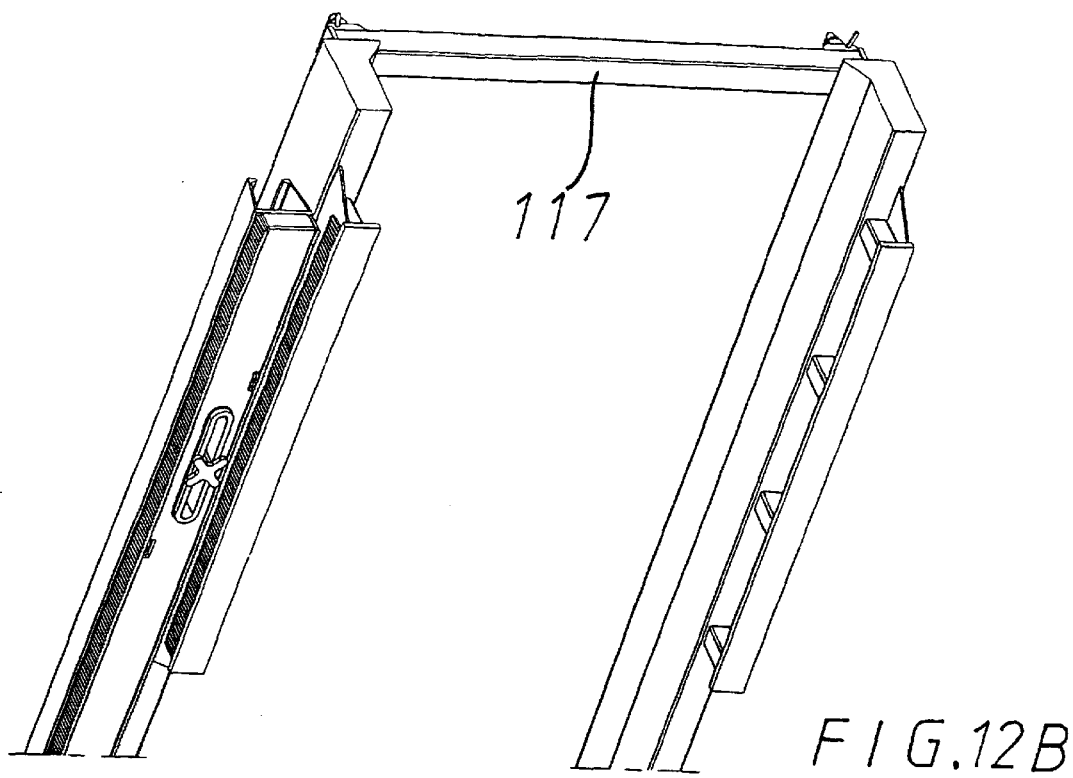
Figure 12C:
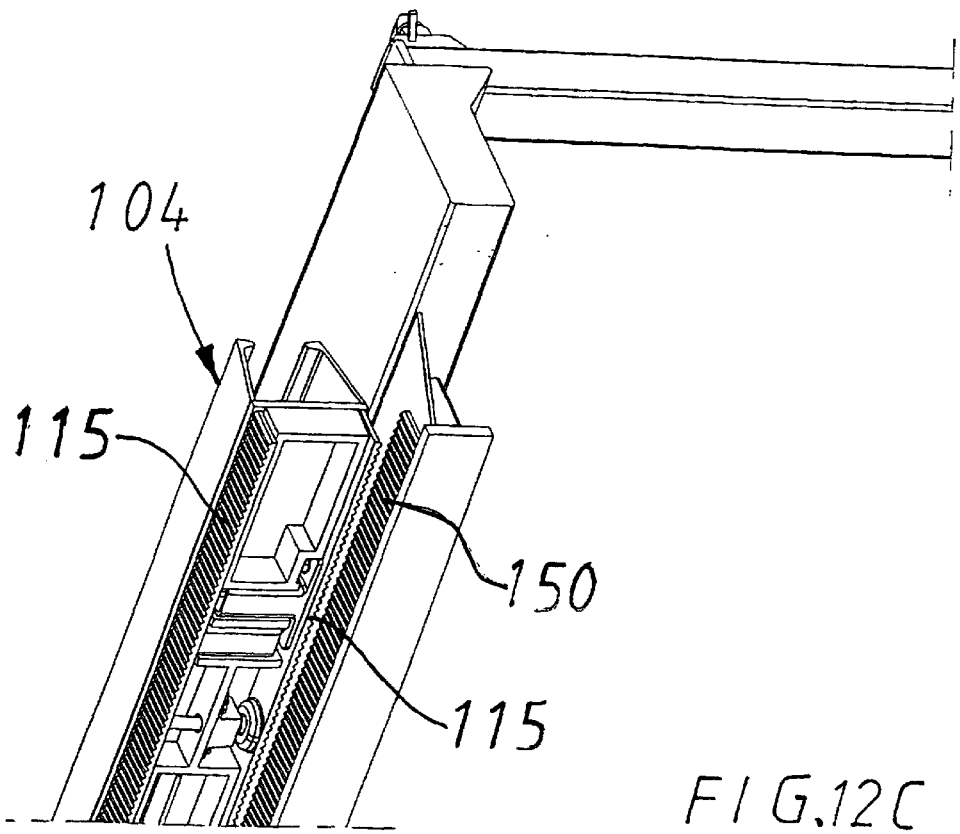
Figure 18:
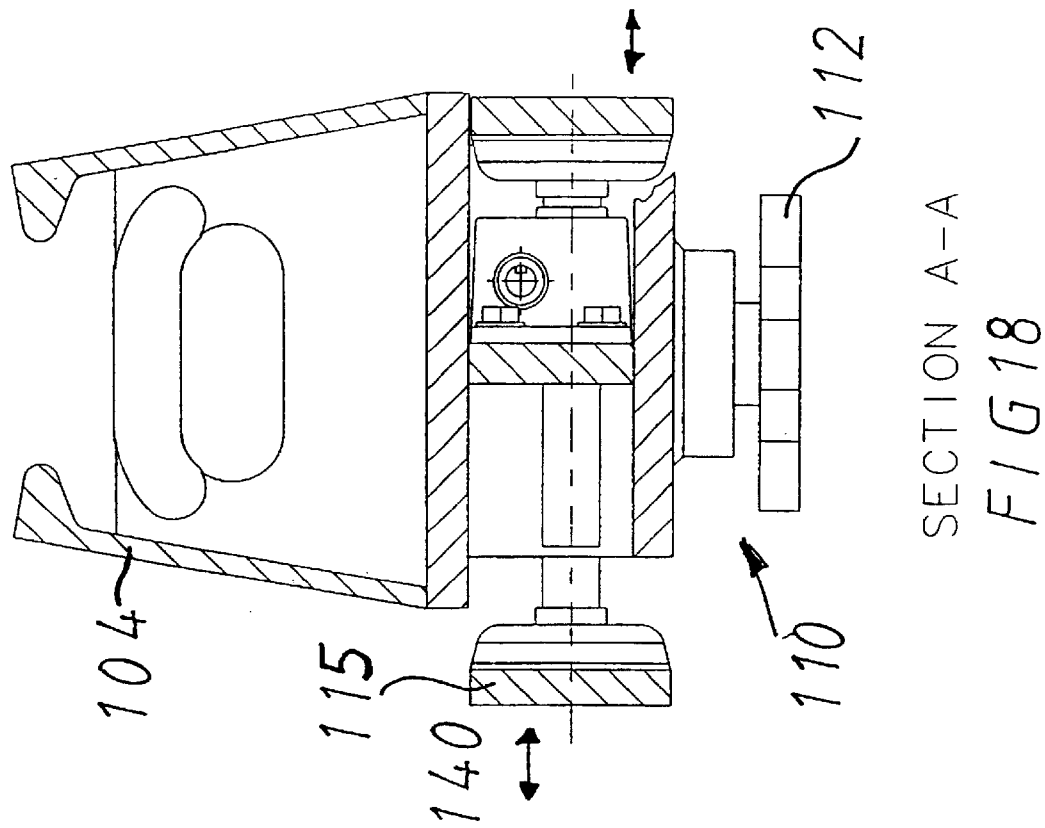
Figure 17:
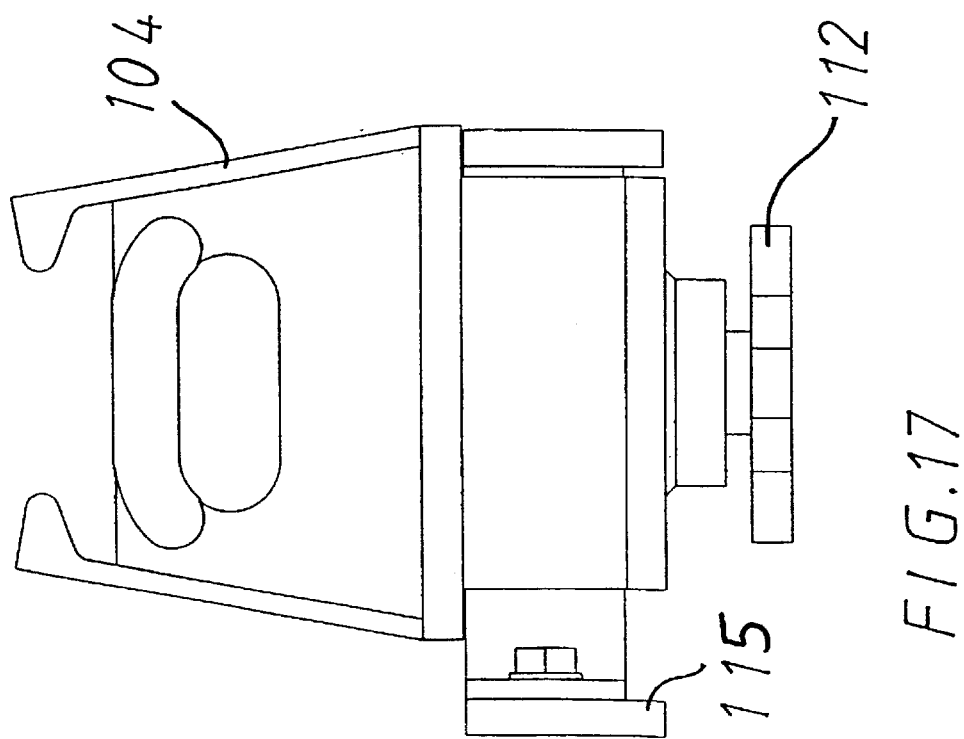
Figure 21:
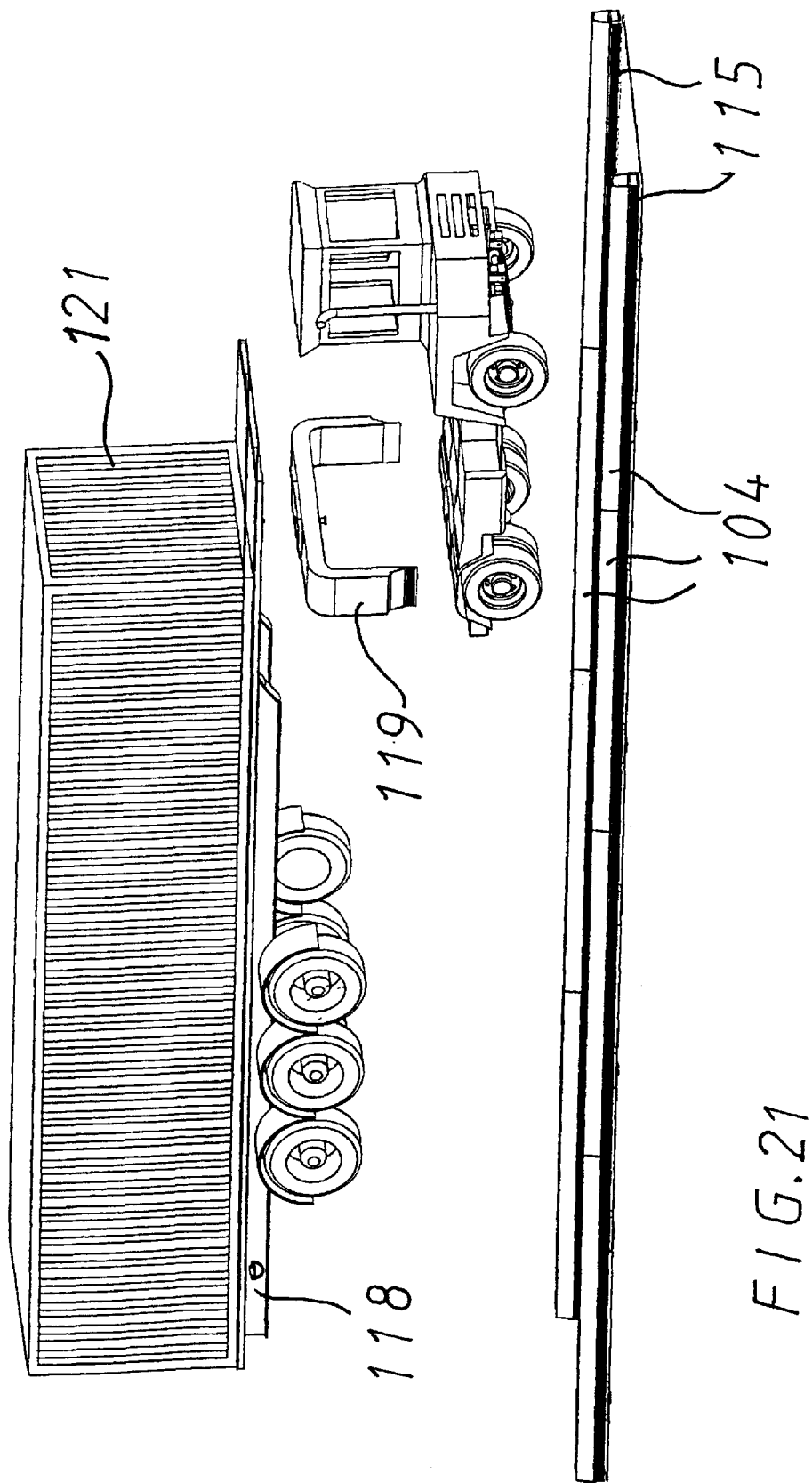
Figure 22:
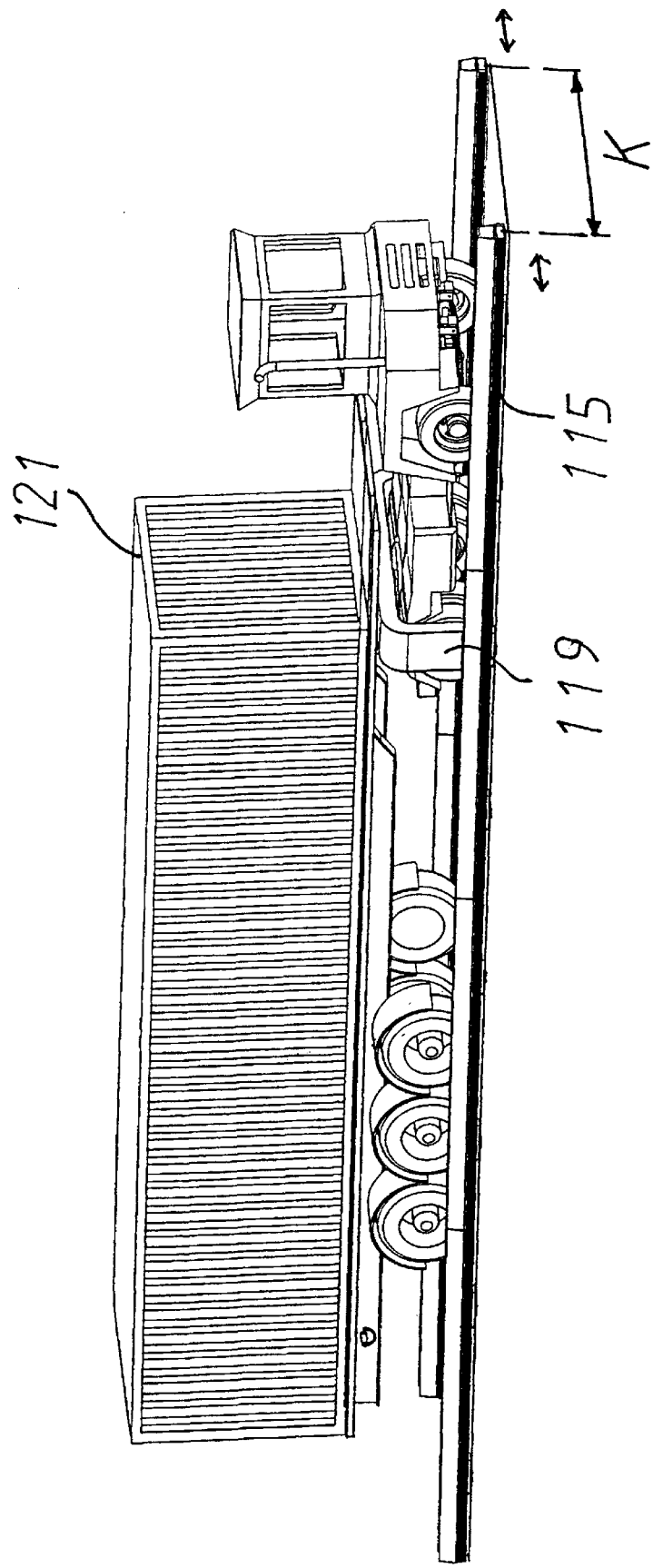
Figure 23:
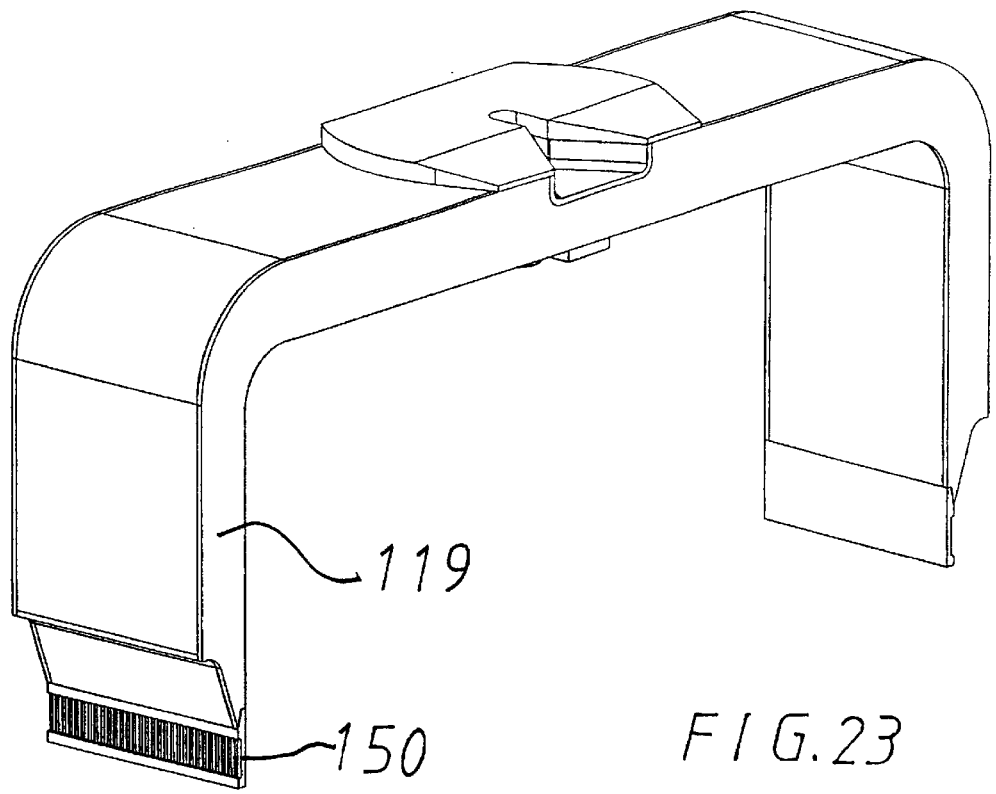
Figure 23A:
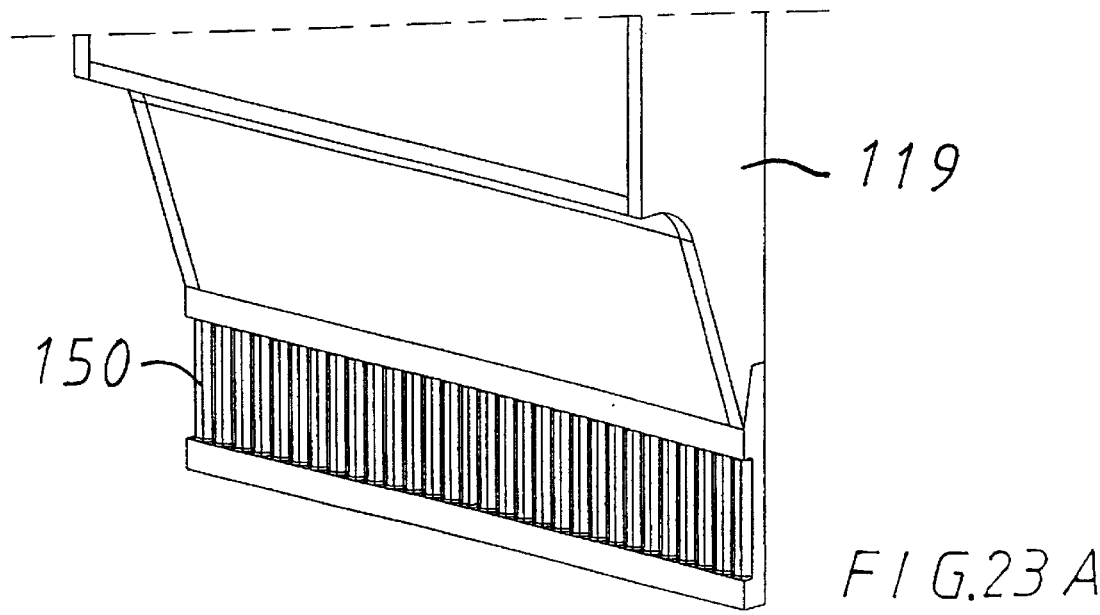
Figure 24:
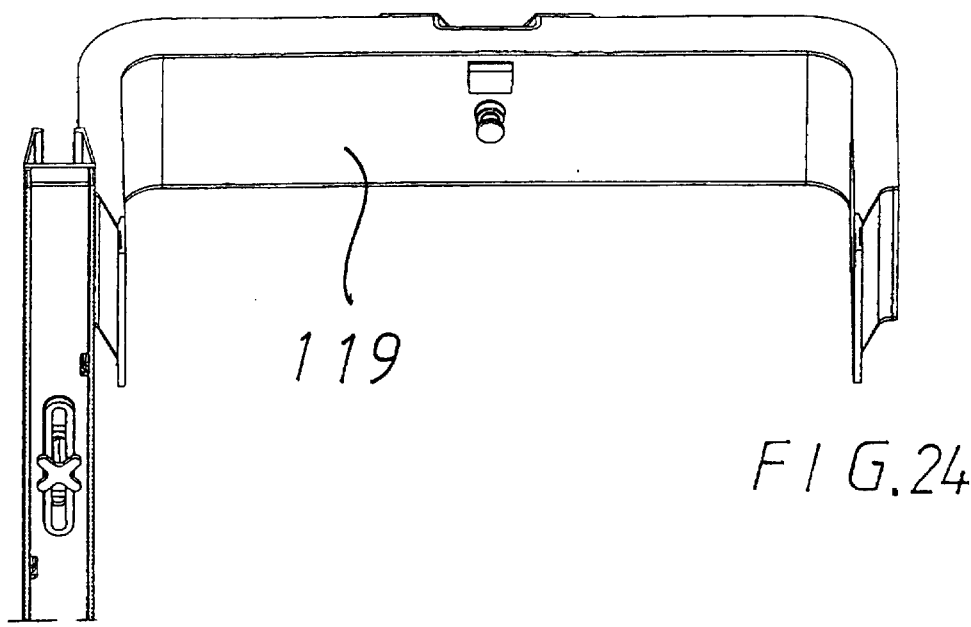
Figure 24A:
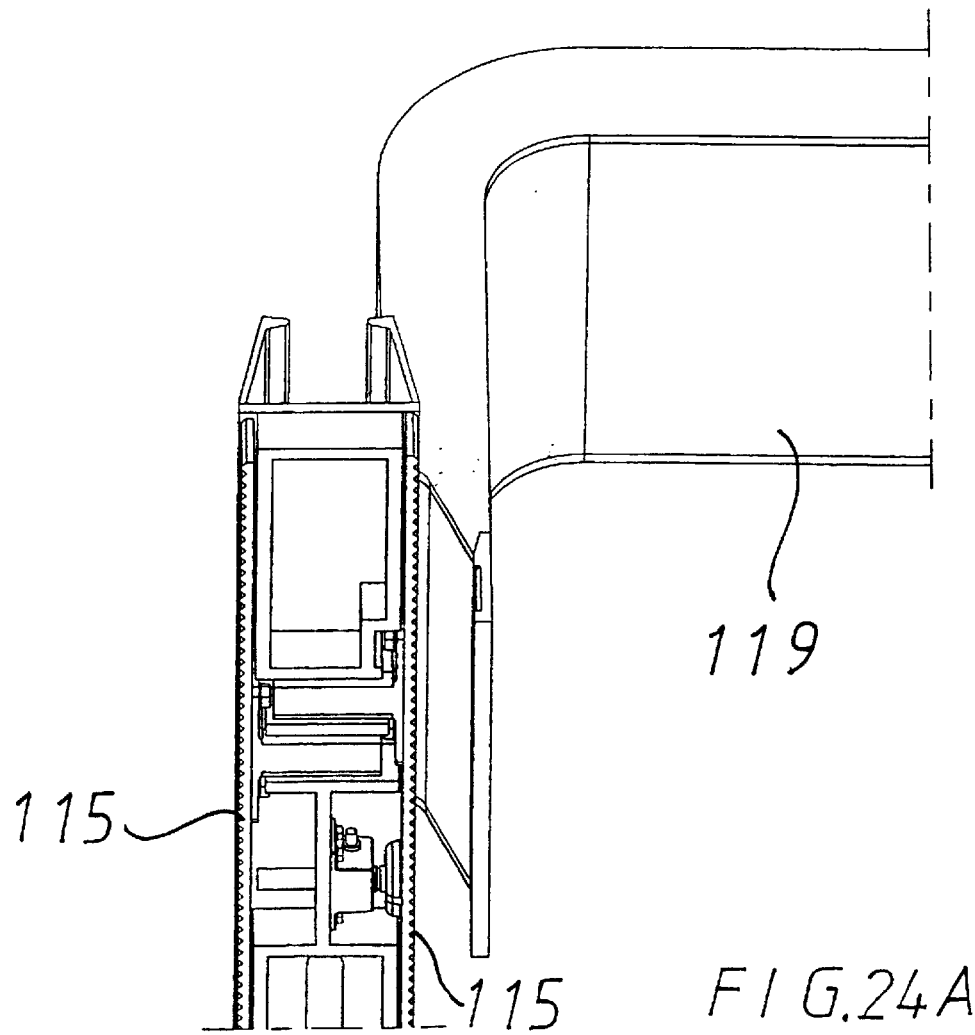
Figure 24B:
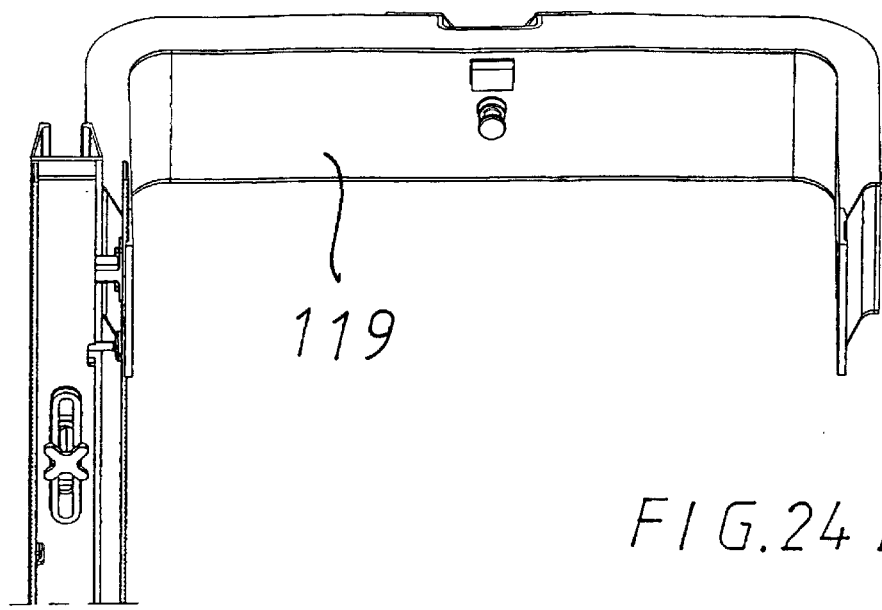
Figure 24C:
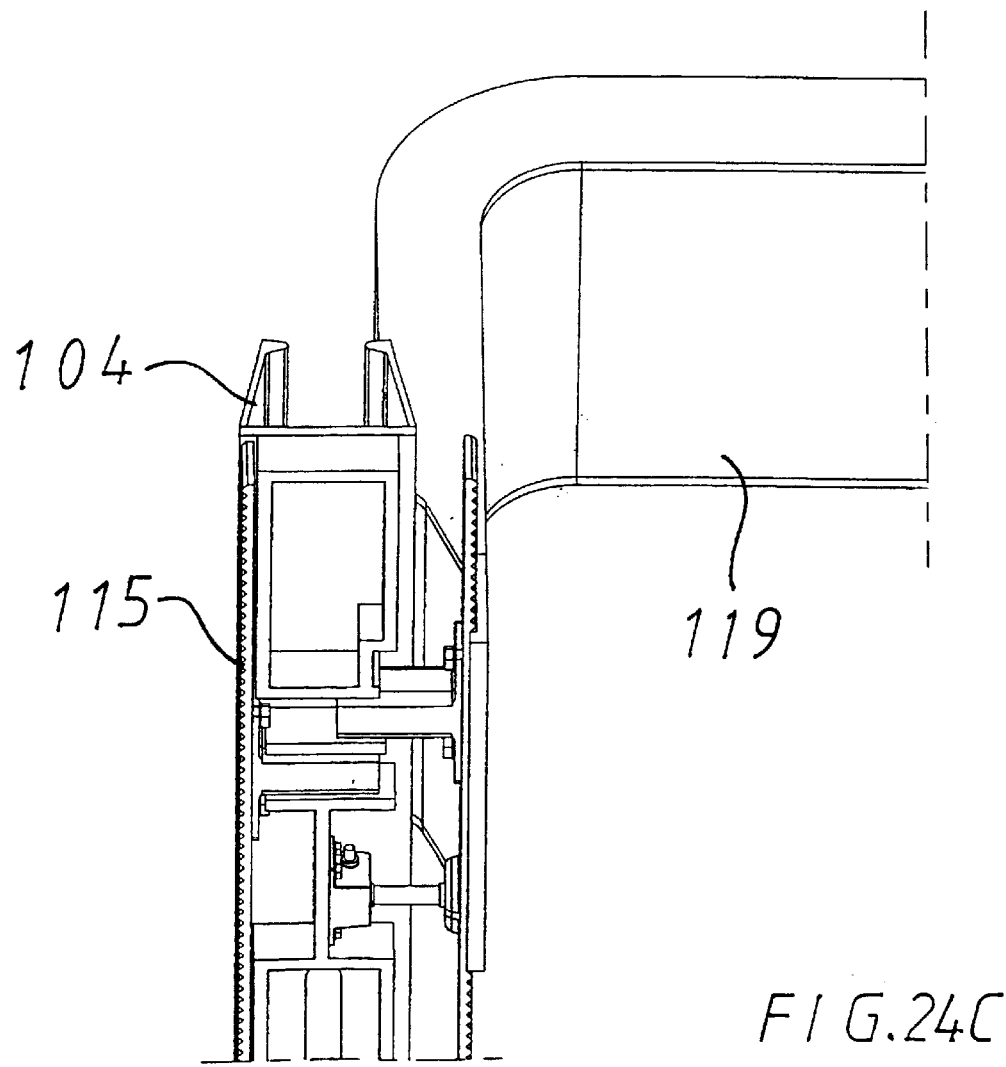

FIG. 10 illustrates how rails which are executed with vertically alternating recesses 150 and projections are attached externally to the cargo 117 in question, for example to supporting legs 155 on the load cassettes 117. Moving grooved metal tracks, so arranged as to be accommodated when they are forced out from the lane dividers 104, are correspondingly attached in, for example, welded-on long fixed metal tracks. The construction and function of these is shown from below in FIGS. 12–12C, i.e. corresponding metal tracks are supported and controlled by horizontal telescopic arrangements and guides 155, 156 on the lane dividers 104 along at least one of their sides.

FIG. 13 shows corresponding grooved recesses and locking devices in a cargo cassette 117 of the kind described above, which is handled with a cargo vehicle 144, for example of the kind indicated above.

Illustrated in greater detail in FIGS. 14–20 is the construction of a lane divider 104 with locking devices 115 each capable of moving in its own direction. Secure locking of the trailer cargo 119, 118 is achieved with lane dividers 104; 110 which are equipped with locking devices 115, for example of the kind of described above in accordance with FIGS. 21–24C.

Figure 25:
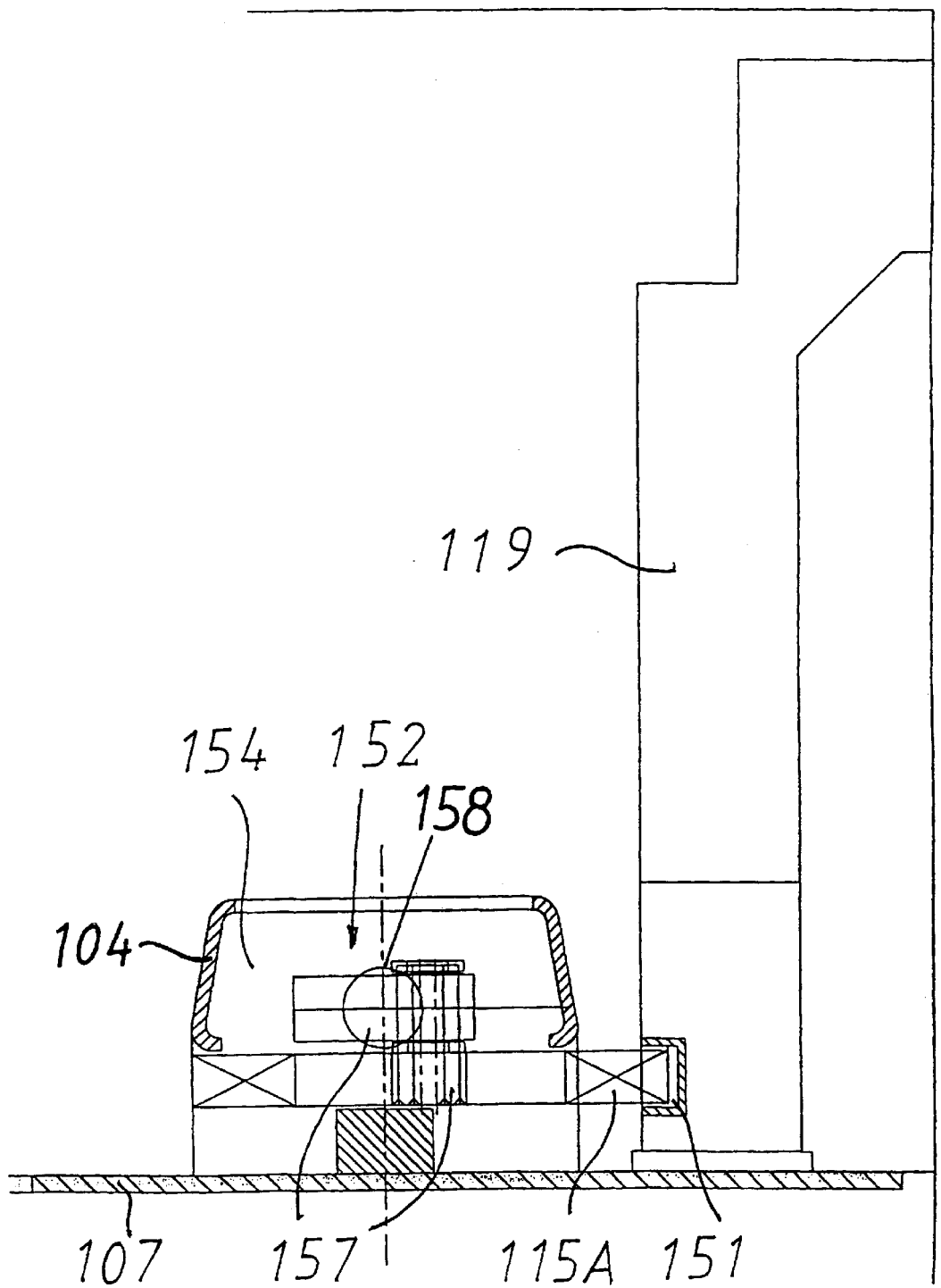
Figure 26:
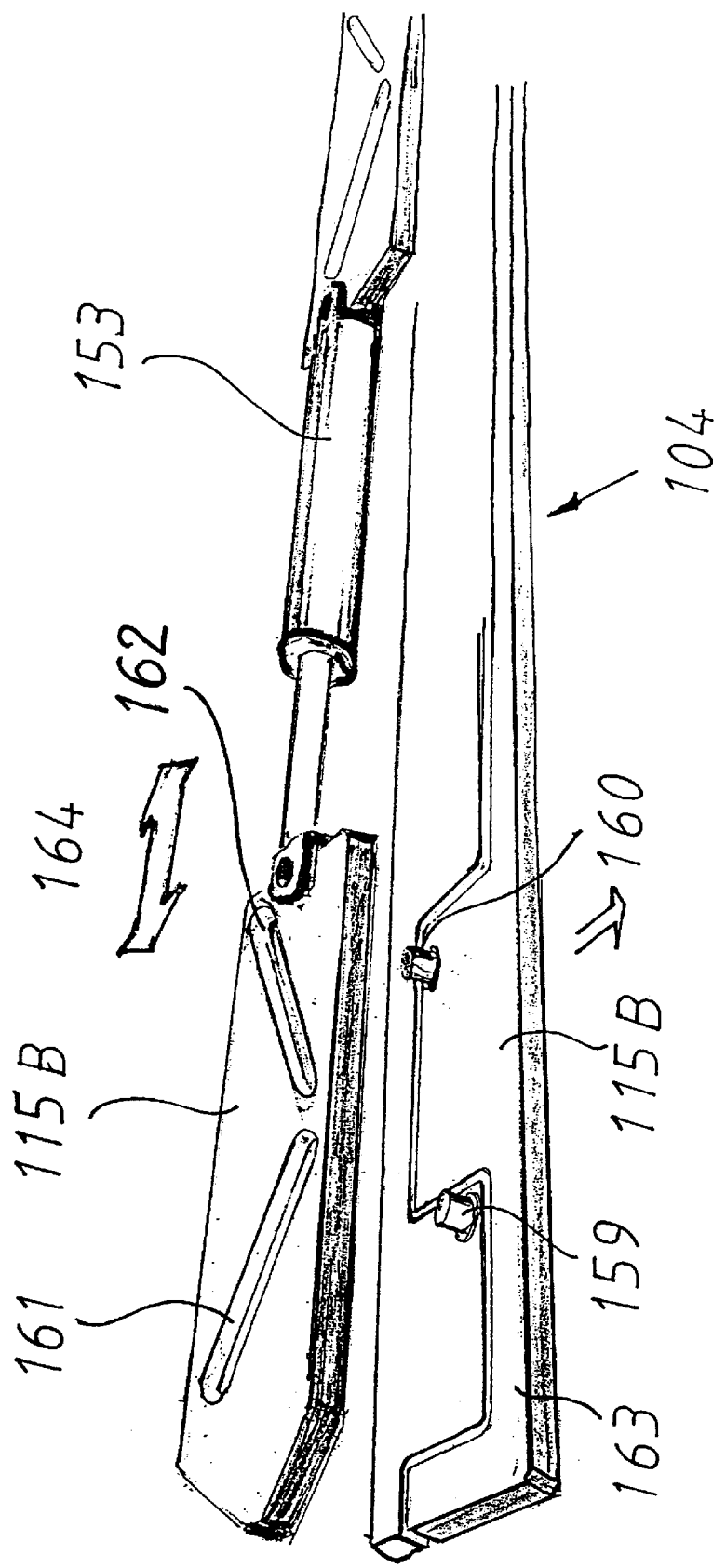

FIG. 25 shows examples of a driving means 152 for locking devices 15A, for example a toothed rack 157 and a worm gear wheel or a toothed gear wheel 158 for the purpose of causing the lateral displacement of the locking device 115A into or out of accommodating openings 151 provided for the purpose in the lane divider 104, which are set down on the deck 107 and attached thereto.

Finally, FIGS. 26–28B show examples of locking devices 115B which are guided by pins and slots 159–162 to produce lateral movements 140 in relation to the lane divider 104 and its frame 163, and which are driven by hydraulic fluid-actuated piston cylinders 153 to cause them to be displaced in a direction 164 along the aforementioned lane divider 104.

The invention is not restricted to the illustrative embodiments described above and shown in the drawings, but may be varied within the scope of the Patent Claims without departing from the idea of invention.

What is claimed is:

1. Arrangement for a cargo handling system which is arranged for use on board a ship, comprising at least one pair of long lane dividers, which are in the form of profiles and are so arranged as to be laid out on a deck of the ship along a longitudinal direction of an intended desired cargo lane at a lateral distance from one another, the profiles exhibit means for attachment of the lane dividers to the deck, the profiles characterized in that the means for attachment are formed by attachment devices matching existing standard openings in the deck and capable of being introduced vertically into the openings, so that a suitable cargo, a cargo trailer or cargo cassettes, can be driven in and accommodated between any one of the pairs of laterally positioned lane dividers so that the cargo is guided in beneath adjacent ones of said lane dividers, and in that at least a number of the lane dividers exhibit lock recesses to accommodate locking devices for the purpose of locking the cargo to the lane dividers and/or in that a number of the lane dividers exhibit laterally mobile locking devices for the purpose of locking the cargo securely in place.

2. Arrangement in accordance with Patent claim 1, characterized in that the lock recesses are in the form of long, channel-like parts, which are situated on the underside of the lane dividers to either side of the lane dividers.

3. Arrangement in accordance with claim 1, characterized in that the lane dividers are in the form of a bottom frame and a number of profile sleeves capable of attachment to the frame.

4. Arrangement in accordance with claim 1, characterized in that the bottom of the lane dividers exhibit channel-like recesses for the purpose of accommodating the attachment devices so that the attachment devices extend through the recesses.

5. Arrangement in accordance with Patent claim 4, characterized in that the channel-like recesses extend through the bottom of the lane dividers in the longitudinal direction of the cargo lane.

6. Arrangement in accordance with claim 1, characterized in that the attachment devices comprise a long rotating bolt having an upper end and a lower end, the lower end, supports a laterally extending attachment part and a clamping means.

7. Arrangement in accordance with Patent claim 6, characterized in that an attachment part is connected in a non-rotating fashion to the rotating bolt and exhibits a peripheral form such that, in the released position, it can be passed through the openings in the deck, whereas, when rotated into a position intended for securing, the attachment part is prevented from being withdrawn through the openings.

8. Arrangement in accordance with claim 1, characterized in that a plurality of securing tensioning devices are accommodated internally in the lane dividers.

9. Arrangement in accordance with Patent claim 8, characterized in that the securing tensioning devices comprise straps with strap tensioners which can be withdrawn and gathered together into rolls at a mutual distance from one another in the respective ones of said lane dividers in spaces which are capable of being closed.

10. Arrangement in accordance with claim 1, characterized in that the profiles consist of a metal material, exhibit slightly converging side walls facing in an upwards direction from a base and a flat or curved upper part.

11. Arrangement in accordance with Patent claim 1, characterized in that a the mobile locking devices are arranged on a side of the lane dividers.

12. Arrangement in accordance with Patent claim 11, characterized in that the mobile locking devices are so arranged as to be accommodated by a recess situated on a side of the cargo.

13. Arrangement in accordance with Patent claim 12, characterized in that the mobile locking devices and the recess are formed by grooved rails capable of interacting with one another.

14. Arrangement in accordance with Patent claim 12, characterized in that the mobile locking devices are formed by long locking heels, which extend along the lane dividers and are capable of lateral displacement in relation to the lane dividers, and which are capable of being accommodated in a recess extending into the lane dividers.

15. Arrangement in accordance with claim 11, characterized in that driving devices for the mobile locking devices are accommodated internally inside the lane dividers.

16. Arrangement in accordance with claim 2, characterized in that the lane dividers are in the form of a bottom frame and a number of profile sleeves capable of attachment to the frame.

17. Arrangement in accordance with claim 2, characterized in that the bottom of the lane dividers exhibits channel-like recesses for the purposes of accommodating the attachment devices so that the attachment devices extend through the recesses.

18. Arrangement in accordance with claim 3, characterized in that the bottom of the lane dividers exhibits channel-like recesses for the purposes of accommodating the attachment devices so that the attachment devices extend through the recesses.

19. Arrangement in accordance with claim 2, characterized in that the respective attachment devices comprise a long rotating bolt, having an upper end and a lower end, the lower end, supports a laterally extending attachment part and a clamping means.

20. Arrangement in accordance with claim 3, characterized in that the respective attachment devices comprise a long rotating bolt, having an upper end and a lower end, the lower end, supports a laterally extending attachment part and a clamping means.

21. Arrangement in accordance with Patent claim 6 wherein the clamping means is a rotating nut capable of attachment at the upper end.

* * * * *